(12) United States Patent
Kim et al.

(10) Patent No.: US 11,294,452 B2
(45) Date of Patent: Apr. 5, 2022

(54) ELECTRONIC DEVICE AND METHOD FOR PROVIDING CONTENT BASED ON THE MOTION OF THE USER

(71) Applicant: Samsung Electronics Co., Ltd., Suwon-si (KR)

(72) Inventors: Junyoung Kim, Suwon-si (KR); Kihwan Kim, Suwon-si (KR); Younjung Kim, Suwon-si (KR); Sanghee Park, Suwon-si (KR); Yunson Yoo, Suwon-si (KR); Minyoung Lee, Suwon-si (KR); Jinhak Lee, Suwon-si (KR); Ilkwang Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/702,373

(22) Filed: Dec. 3, 2019

(65) Prior Publication Data

US 2020/0174556 A1  Jun. 4, 2020

(30) Foreign Application Priority Data

Dec. 3, 2018 (KR) .................. 10-2018-0153737

(51) Int. Cl.
*G06F 3/01* (2006.01)
(52) U.S. Cl.
CPC .................. *G06F 3/011* (2013.01)
(58) Field of Classification Search
None
See application file for complete search history.

(56) References Cited

U.S. PATENT DOCUMENTS

| | | | | |
|---|---|---|---|---|
| 2013/0009865 | A1* | 1/2013 | Valik | G06F 3/0304 345/156 |
| 2013/0283213 | A1* | 10/2013 | Guendelman | G06F 3/04842 715/848 |
| 2014/0104161 | A1* | 4/2014 | Liao | G06F 3/017 345/156 |
| 2015/0278583 | A1* | 10/2015 | Yokokawa | G06T 7/70 345/156 |
| 2016/0094787 | A1* | 3/2016 | Govil | H04N 5/3745 348/310 |
| 2017/0011557 | A1 | 1/2017 | Lee et al. | |
| 2020/0012350 | A1* | 1/2020 | Tay | G06F 3/012 |

FOREIGN PATENT DOCUMENTS

| | | |
|---|---|---|
| KR | 10-2014-0140482 A | 12/2014 |
| KR | 10-2017-0005602 A | 1/2017 |

* cited by examiner

*Primary Examiner* — Joseph R Haley

(57) ABSTRACT

An electronic device includes a sensor, a display, a processor operatively coupled to the sensor and the display, and a memory operatively coupled to the processor. The memory stores instructions that, when executed by the processor, causes the processor to identify a first body part of a user based on the at least one sensor, identify a virtual region spaced apart by a designated distance from the first body part, based on the identified first body part, identify a second body part distinct from the first body part within the virtual region, based on the at least one sensor, and change at least part of content displayed on the display based on a position of the second body part within the virtual region.

14 Claims, 13 Drawing Sheets

ELECTRONIC DEVICE AND METHOD FOR PROVIDING CONTENT BASED ON THE MOTION OF THE USER

CROSS-REFERENCE TO RELATED APPLICATION

This application is based on and claims priority under 35 U.S.C. 119 to Korean Patent Application No. 10-2018-0153737 filed on Dec. 3, 2018, in the Korean Intellectual Property Office, the disclosure of which is herein incorporated by reference in its entirety.

BACKGROUND

1. Field

Various embodiments relate to a method for providing content based on a motion of a user in an electronic device, and the electronic device supporting the method.

2. Description of Related Art

With the technical advancement, an electronic device (e.g., a smartphone, etc.) includes various sensors to perform a specific sensing function. The electronic device may use the sensing function to provide content, based on a motion of a user.

SUMMARY

An electronic device according to various embodiments may include at least one sensor, a display, a processor operatively coupled to the at least one sensor and the display, and a memory operatively coupled to the processor. The memory may store instructions, when executed, for allowing the processor to identify a first body part of a user based on the at least one sensor, identify a virtual region spaced apart by a designated distance from the first body part, based on the identified first body part, and in response to identifying a second body part distinct from the first body part within the virtual region, based on the at least one sensor, change at least part of content displayed on the display based on a position of the second body part within the virtual region.

An electronic device according to various embodiments may include at least one sensor, a communication interface, a processor operatively coupled to the at least one sensor and the communication interface, and a memory operatively coupled to the processor. The memory may store instructions, when executed, for allowing the processor to identify an external electronic device distinct from the electronic device via the communication interface, identify a first body part of a user based on the at least one sensor while the content is displayed, identify a virtual region spaced apart by a designated distance from the first body part, in response to identifying the first body part, and in response to identifying a second body part distinct from the first body part within the virtual region, change at least part of the display content based on a position of the second body part within the virtual region, based on the at least one sensor, while the content is displayed.

An electronic device according to various embodiments may include at least one sensor, a display, a processor operatively coupled to the at least one sensor and the display, and a memory operatively coupled to the processor. The memory may store instructions, when executed, for allowing the processor to in response to identifying a body part of a user at a first position based on the at least one sensor, display a visual element within the display based on the first position and a motion of the body part of the user spaced apart from the display, identify that the user moves from the first position to a second position while the visual element is displayed, identify the body part of the user who moves to the second position, in response to identifying that the user moves from the first position to the second position, and change a position of a visual element displayed within the display based on the second position and a motion of the body part of the user, in response to identifying the body part of the user who moves to the second position.

An electronic device according to various embodiments may provide a method for controlling content based on a motion of a user.

An electronic device according to various embodiments may provide a method for controlling content by rapidly detecting a motion of a user even in low illuminance.

Advantages acquired in various embodiments of the disclosure are not limited to the aforementioned advantages, and other advantages not mentioned herein can be clearly understood by those skilled in the art to which the disclosure pertains from the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
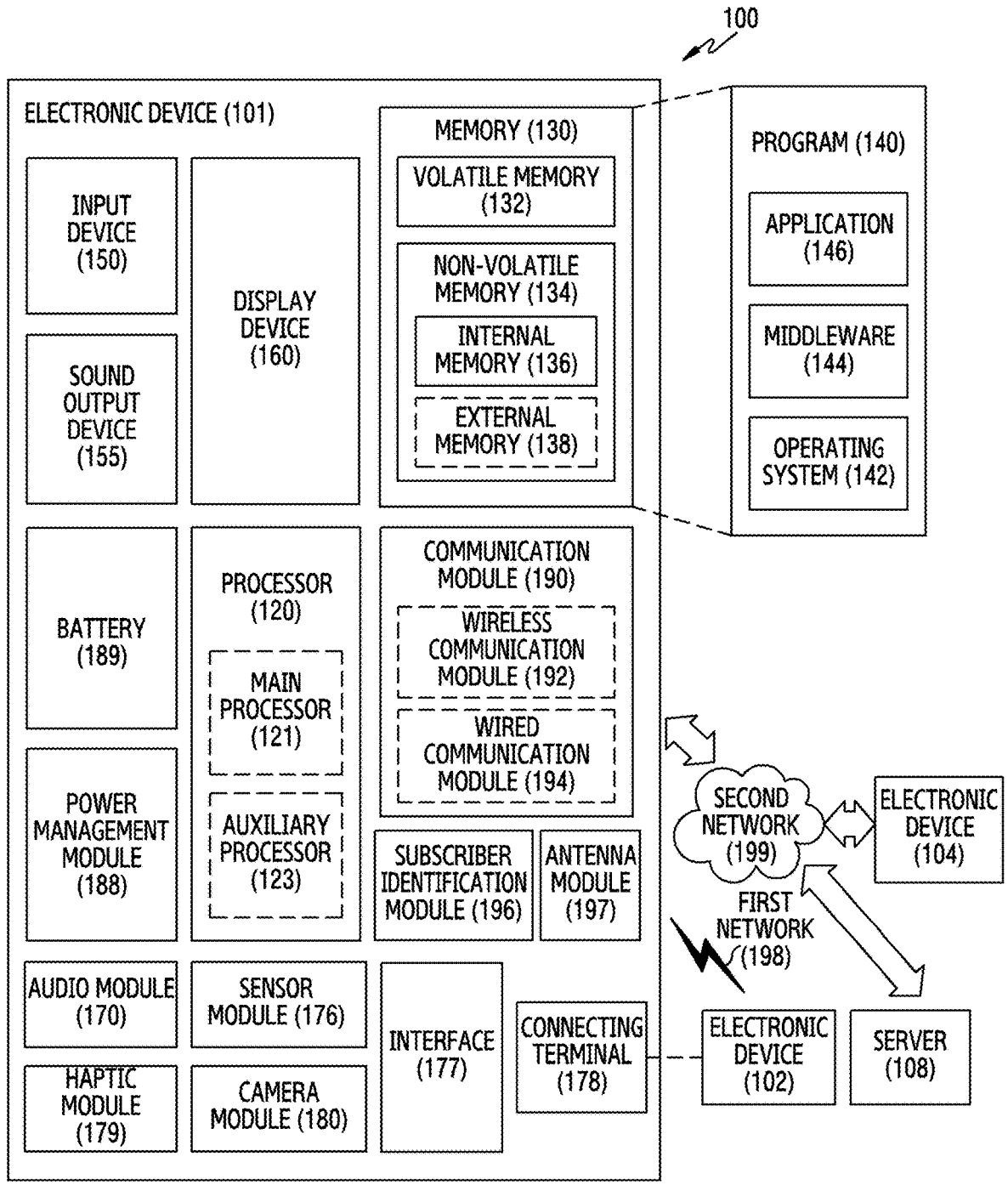
FIG. 1 is a block diagram illustrating an electronic device in a network environment according to various embodiments.

FIG. 1 is a block diagram illustrating an electronic device (101) in a network environment (100) according to various embodiments. Referring to FIG. 1, the electronic device (101) in the network environment (100) may communicate with an electronic device (102) via a first network (198) (e.g., a short-range wireless communication network), or an electronic device (104) or a server (108) via a second network (199) (e.g., a long-range wireless communication network). According to an embodiment, the electronic device (101) may communicate with the electronic device (104) via the server (108). According to an embodiment, the electronic device (101) may include a processor (120), memory (130), an input device (150), a sound output device (155), a display device (160), an audio module (170), a sensor module (176), an interface (177), a haptic module (179), a camera module (180), a power management module (188), a battery (189), a communication module (190), a subscriber identification module (SIM) (196), or an antenna module (197). In some embodiments, at least one (e.g., the display device (160) or the camera module (180)) of the components may be omitted from the electronic device (101), or one or more other components may be added in the electronic device (101). In some embodiments, some of the components may be implemented as single integrated circuitry. For example, the sensor module (176) (e.g., a fingerprint sensor, an iris sensor, or an illuminance sensor) may be implemented as embedded in the display device (160) (e.g., a display).

The processor (120) may execute, for example, software (e.g., a program (140)) to control at least one other component (e.g., a hardware or software component) of the electronic device (101) coupled with the processor (120), and may perform various data processing or computation. According to one embodiment, as at least part of the data processing or computation, the processor (120) may load a command or data received from another component (e.g., the sensor module (176) or the communication module (190)) in volatile memory (132), process the command or the data stored in the volatile memory (132), and store resulting data in non-volatile memory (134). According to an embodiment, the processor (120) may include a main processor (121) (e.g., a central processing unit (CPU) or an application processor (AP)), and an auxiliary processor (123) (e.g., a graphics processing unit (GPU), an image signal processor (ISP), a sensor hub processor, or a communication processor (CP)) that is operable independently from, or in conjunction with, the main processor (121). Additionally or alternatively, the auxiliary processor (123) may be adapted to consume less power than the main processor (121), or to be specific to a specified function. The auxiliary processor (123) may be implemented as separate from, or as part of the main processor (121).

The auxiliary processor (123) may control at least some of functions or states related to at least one component (e.g., the display device (160), the sensor module (176), or the communication module (190)) among the components of the electronic device (101), instead of the main processor (121) while the main processor (121) is in an inactive (e.g., sleep) state, or together with the main processor (121) while the main processor (121) is in an active state (e.g., executing an application). According to an embodiment, the auxiliary processor (123) (e.g., an image signal processor or a communication processor) may be implemented as part of another component (e.g., the camera module (180) or the communication module (190)) functionally related to the auxiliary processor (123).

The memory (130) may store various data used by at least one component (e.g., the processor (120) or the sensor module (176)) of the electronic device (101). The various data may include, for example, software (e.g., the program (140)) and input data or output data for a command related thereto. The memory (130) may include the volatile memory (132) or the non-volatile memory (134).

The program (140) may be stored in the memory (130) as software, and may include, for example, an operating system (OS) (142), middleware (144), or an application (146).

The input device (150) may receive a command or data to be used by other component (e.g., the processor (120)) of the electronic device (101), from the outside (e.g., a user) of the electronic device (101). The input device (150) may include, for example, a microphone, a mouse, a keyboard, or a digital pen (e.g., a stylus pen).

The sound output device (155) may output sound signals to the outside of the electronic device (101). The sound output device (155) may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device (160) may visually provide information to the outside (e.g., a user) of the electronic device (101). The display device (160) may include, for example, a display, a hologram device, or a projector and control circuitry to control a corresponding one of the display, hologram device, and projector. According to an embodiment, the display device (160) may include touch circuitry adapted to detect a touch, or sensor circuitry (e.g., a pressure sensor) adapted to measure the intensity of force incurred by the touch.

The audio module (170) may convert a sound into an electrical signal and vice versa. According to an embodiment, the audio module (170) may obtain the sound via the input device (150), or output the sound via the sound output device (155) or a headphone of an external electronic device (e.g., an electronic device (102)) directly (e.g., wiredly) or wirelessly coupled with the electronic device (101).

The sensor module (176) may detect an operational state (e.g., power or temperature) of the electronic device (101) or an environmental state (e.g., a state of a user) external to the electronic device (101), and then generate an electrical signal or data value corresponding to the detected state. According to an embodiment, the sensor module (176) may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface (177) may support one or more specified protocols to be used for the electronic device (101) to be coupled with the external electronic device (e.g., the electronic device (102)) directly (e.g., wiredly) or wirelessly. According to an embodiment, the interface (177) may include, for example, a high definition multimedia interface (HDMI), a universal serial bus (USB) interface, a secure digital (SD) card interface, or an audio interface.

A connecting terminal (178) may include a connector via which the electronic device (101) may be physically connected with the external electronic device (e.g., the electronic device (102)). According to an embodiment, the connecting terminal (178) may include, for example, a HDMI connector, a USB connector, a SD card connector, or an audio connector (e.g., a headphone connector).

The haptic module (179) may convert an electrical signal into a mechanical stimulus (e.g., a vibration or a movement) or electrical stimulus which may be recognized by a user via his tactile sensation or kinesthetic sensation. According to an embodiment, the haptic module (179) may include, for example, a motor, a piezoelectric element, or an electric stimulator.

The camera module (180) may capture a still image or moving images. According to an embodiment, the camera module (180) may include one or more lenses, image sensors, image signal processors, or flashes.

The power management module (188) may manage power supplied to the electronic device (101). According to one embodiment, the power management module (188) may be implemented as at least part of, for example, a power management integrated circuit (PMIC).

The battery (189) may supply power to at least one component of the electronic device (101). According to an embodiment, the battery (189) may include, for example, a primary cell which is not rechargeable, a secondary cell which is rechargeable, or a fuel cell.

The communication module (190) may support establishing a direct (e.g., wired) communication channel or a wireless communication channel between the electronic device (101) and the external electronic device (e.g., the electronic device (102), the electronic device (104), or the server (108)) and performing communication via the established communication channel. The communication module (190) may include one or more communication processors that are operable independently from the processor (120) (e.g., the application processor (AP)) and supports a direct (e.g., wired) communication or a wireless communication. According to an embodiment, the communication module (190) may include a wireless communication module (192) (e.g., a cellular communication module, a short-range wireless communication module, or a global navigation satellite system (GNSS) communication module) or a wired communication module (194) (e.g., a local area network (LAN) communication module or a power line communication (PLC) module). A corresponding one of these communication modules may communicate with the external electronic device via the first network (198) (e.g., a short-range communication network, such as Bluetooth™, wireless-fidelity (Wi-Fi) direct, or infrared data association (IrDA)) or the second network (199) (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module (192) may identify and authenticate the electronic device (101) in a communication network, such as the first network (198) or the second network (199), using subscriber information (e.g., international mobile subscriber identity (IMSI)) stored in the subscriber identification module (196).

The antenna module (197) may transmit or receive a signal or power to or from the outside (e.g., the external electronic device) of the electronic device (101). According to an embodiment, the antenna module (197) may include a plurality of antennas. In such a case, at least one antenna appropriate for a communication scheme used in the communication network, such as the first network (198) or the second network (199), may be selected, for example, by the communication module (190) (e.g., the wireless communication module (192)) from the plurality of antennas. The signal or the power may then be transmitted or received between the communication module (190) and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device (101) and the external electronic device (104) via the server (108) coupled with the second network (199). Each of the electronic devices (102) and (104) may be a device of a same type as, or a different type, from the electronic device (101). According to an embodiment, all or some of operations to be executed at the electronic device (101) may be executed at one or more of the external electronic devices (102), (104), or (108). For example, if the electronic device (101) should perform a function or a service automatically, or in response to a request from a user or another device, the electronic device (101), instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device (101). The electronic device (101) may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program (140)) including one or more instructions that are stored in a storage medium (e.g., internal memory (136) or external memory (138)) that is readable by a machine (e.g., the electronic device (101)). For example, a processor (e.g., the processor (120)) of the machine (e.g., the electronic device (101)) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
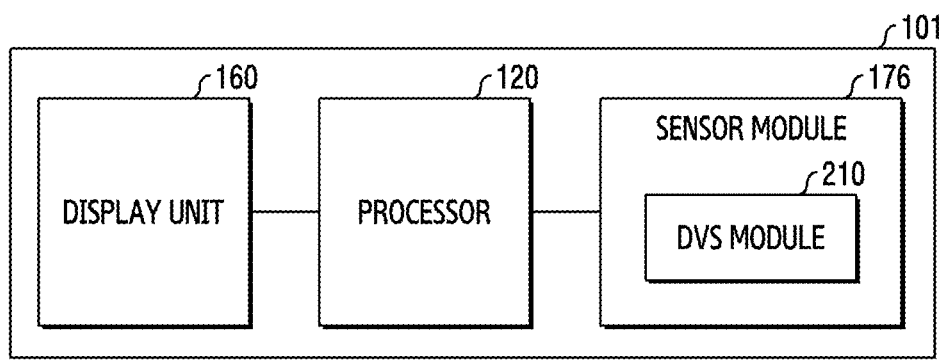
FIG. 2A illustrates an example of a functional structure of an electronic device for displaying content based on a motion of a user according to various embodiments.

FIG. 2A illustrates an example of a functional structure of an electronic device 101 for displaying content based on a motion of a user according to various embodiments. At least part of the functional structure of FIG. 2A may be included in the electronic device 101 of FIG. 1.

Referring to FIG. 2A, the electronic device 101 may include a processor 120, a sensor module 176, and a display unit 160. However, the disclosure is not limited thereto, and thus some components may be omitted.

In various embodiments, the sensor module 176 may include a Dynamic Vision Sensor (DVS) module 210. The DVS module 210 may sense the motion of the user. According to an embodiment, the DVS module 210 may use at least one sensor to sense a portion where motion has occurred in a subject. The DVS module 210 may trace a motion trajectory of the portion where the motion has occurred.

According to an embodiment, the DVS module 210 may include a plurality of light receiving elements. The DVS module 210 may configure a plurality of pixels from the plurality of light receiving elements. The DVS module 210 may measure an intensity of light introduced from the outside through each of the plurality of pixels. The DVS module 210 may identify that the subject moves when an intensity change of light introduced from the outside from each of the plurality of pixels is greater than or equal to a threshold. Data output from the DVS module 210 may include data related to one or more pixels in which the intensity change of light is greater than or equal to the threshold among intensities of light output from all of the plurality of pixels. In an embodiment, among the intensities of light output from all of the plurality of pixels, data related to one or more pixels in which the intensity change of light is less than or equal to the threshold or less than the threshold may be excluded from the data output from the DVS module 210.

According to an embodiment, the DVS module 210 may include a plurality of DVSs. The DVS module 210 may detect a 3-dimensional motion of the subject. In an embodiment, the 3-dimensional motion of the subject may be detected based on a distance between the plurality of DVSs. In an embodiment, the 3-dimensional motion of the subject may be detected based on a difference of the plurality of DVSs (e.g., a parallax between images measured respectively in the plurality of DVSs). The DVS module 210 may represent the motion of the subject on a 3-dimensional coordinate. According to an embodiment, the DVS module 210 may transmit information on the motion of the identified subject to the processor 120.

According to an embodiment, the DVS module 210 may operate when a brightness change of the pixel is greater than or equal to a threshold. The DVS module 210 may detect the motion of the subject also in a dark environment (e.g., a low illuminance less than or equal to about 10 Lux). Since the DVS module 210 operates in response to the brightness change of the pixel, energy may be less consumed.

In some embodiments, the sensor module 176 may include one or more image sensors (not shown) for detecting the 3-dimensional motion of the subject. Based on a distance or parallax between the one or more image sensors, the sensor module 176 or the processor 120 may measure the 3-dimensional motion of the subject.

In various embodiments, the display unit 160 may output content, data, or signals. According to an embodiment, the display unit 160 may display image data processed by the processor 120. According to an embodiment, the display unit 160 may use a beam to display content by projecting a screen on a plane of incidence. The display unit 160 may include a circuit for projecting the screen through a beam or a light source for outputting the beam.

According to an embodiment, the display unit 160 may be configured with an integrated touch screen by being coupled with a plurality of touch sensors capable of receiving a touch input. When the display unit 160 is configured with the touch screen, the plurality of touch sensors may be disposed above the display unit 160 or may be disposed below the display unit 160.

In various embodiments, the processor 120 may provide overall control to the electronic device 101. According to an embodiment, to provide overall control to the electronic device 101, the processor 120 may be operatively coupled to other components in the electronic device 101, such as the sensor module 176 or the display unit 160. According to an embodiment, the processor 120 may receive a command of other components (e.g., the sensor module 176 or the display unit 160). The processor 120 may interpret the received command. The processor 120 may perform computations according to the interpreted command, and may process data. The processor 120 may be implemented in software, or may be implemented in hardware such as a chip or a circuitry, or may be implemented in a combination of software and/or hardware. The processor 120 may be one entity or may be a combination of a plurality of processors.

According to an embodiment, the processor 120 may interpret a message, data, command, or signal received from the sensor module 176 or the display unit 160. The processor 120 may process the message, data, command, or signal received from the sensor module 176 or the display unit 160. The processor 120 may generate a new message, data, command, or signal based on the received message, data, command, or signal. The processor 120 may provide the processed or generated message, data, command, or signal to the sensor module 176 or the display unit 160.

In various embodiments, the processor 120 may identify the user of the electronic device 101 via the DVS module 210. The processor 120 may identify a first body part of the user of the electronic device 101. According to an embodiment, the first body part may include at least one of an arm, a torso, a shoulder, an eye, and a head.

According to an embodiment, the processor 120 may identify (or determine) a virtual region spaced apart by a designated distance from the first body part. According to an embodiment, the processor 120 may identify the virtual region spaced apart by the designated distance from the first body part, in response to identifying the first body part. According to an embodiment, the processor 120 may set the designated distance based on the user identified by using the DVS module 210. For example, the processor 120 may change the designated distance based on a distance between the identified user and the electronic device 101. According to an embodiment, the processor 120 may identify the virtual region spaced apart from the first body part, in a space accessible through a second body part (e.g., a hand, a palm, or an elbow) of the user. According to an embodiment, the virtual region may imply a region invisible to eyes of the user of the electronic device 101 but recognizable as a screen by the user.

According to an embodiment, the processor 120 may identify (or determine) the virtual region based on the display unit 160. For example, the processor 120 may identify the virtual region so as to have a ratio of a resolution of the display unit 160. For example, when the display unit 160 has a Full High Definition (FHD) resolution, the processor 120 may identify a ratio of the virtual region as a ratio of 16:9. For another example, when the display unit 160 has the FHD resolution, the processor 120 may identify the virtual region through an absolute coordinate having the ratio of 16:9. According to an embodiment, the processor 120 may identify the virtual region based on the user of the electronic device 101. For example, the processor 120 may identify a length from the eyes to waist of the user of the electronic device 101 as a vertical length of the virtual region. The processor 120 may identify a horizontal length of the virtual region based on the resolution of the display unit 160. The processor 120 may identify the virtual region so that the virtual region is located at a center of the user's body.

According to an embodiment, the processor 120 may change the display of content based on a position of the second body part of the user of the electronic device 101. According to an embodiment, the second body part may include at least one of a hand, a palm, a finger, and an elbow. According to an embodiment, the processor 120 may identify that the second body part of the user approaches (or enters) the virtual region. The processor 120 may identify a position where the second body part of the user enters within virtual region. The processor 120 may identify a point (or area) within a display region displayed via the display unit 160 corresponding to the position where the second body part of the user enters. The processor 120 may change the display of content of the point (or area) within the display region.

According to an embodiment, the processor 120 may identify an absolute coordinate of the virtual region at the position where the second body part of the user enters. The processor 120 may change the display of content displayed on the point (or area) of the display region displayed via the display unit 160, corresponding to the identified absolute coordinate of the virtual region. According to an embodiment, the processor 120 may change the display of content based on a motion of the second body part of the user of the electronic device 101. For example, the processor 120 may recognize a tap action within the display region displayed via the display unit 160, in response to identifying that a hand of the user of the electronic device 101 enters the virtual region. For another example, the processor 120 may recognize a drag-and-drop action within the display region displayed via the display unit 160, in response to identifying that the user of the electronic device 101 moves to the right within the virtual region with a clenched fist.

In various embodiments, in response to identifying a body part of the user located at the first position, the processor 120 may display a visual element via the display unit 160 based on the first position and the motion of the body part of the user spaced apart from the display unit 160. According to an embodiment, the first position where the user of the electronic device 101 is located may be located within a region measurable by the DVS module 210. According to an embodiment, the body part of the user may include at least one of a hand, a finger, a foot, a head, a hand, and an elbow. According to an embodiment, the visual element may include a cursor. According to an embodiment, the processor 120 may identify (or determine) a first virtual region in front of the user located at the first position. The processor 120 may display the visual element based on the motion of the user's body part within the first virtual region.

According to an embodiment, the processor 120 may identify that the user of the electronic device 101 moves from the first position to the second position. The processor 120 may identify the movement of the user via the DVS module 210. According to an embodiment, the movement of the user from the first position to the second position may include that the user rotates in place or that a geographical position of the user changes. According to an embodiment, the second position may be located within a region measurable by the DVS module 210.

According to an embodiment, the processor 120 may identify the body part of the user who moves to the second position, in response to identifying the movement of the user of the electronic device 101 from the first position to the second position. According to an embodiment, the processor 120 may identify the user who moves to the second position, and may identify the body part of the user.

According to an embodiment, the processor 120 may change a position of the visual element displayed via the display unit 160 based on the second position and the motion of the user's body part, in response to identifying the body part of the user of the electronic device 101. For example, the processor 120 may change a position of a cursor according to a motion of a hand of the user located at the second position. According to an embodiment, the processor 120 may identify (or determine) a second virtual region in front of the user located at the second position. The processor 120 may change the position of the visual element displayed via the display unit 160 based on the motion of the user's body part within the second virtual region.

Figure 2B:
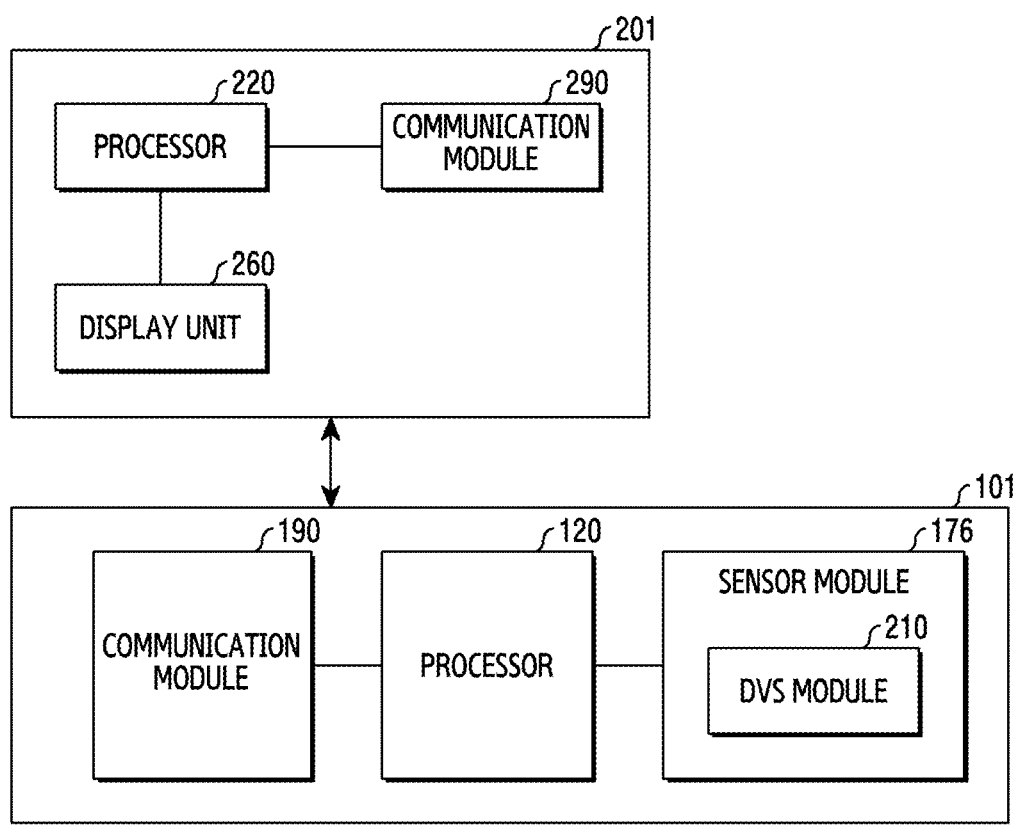
FIG. 2B illustrates another example of a functional structure of an electronic device for displaying content based on a motion of a user and an external electronic device according to various embodiments.

FIG. 2B illustrates another example of a functional structure of the electronic device 101 for displaying content based on a motion of a user and an external electronic device 201 according to various embodiments. At least part of the functional structure of FIG. 2A may be included in the electronic device 101 of FIG. 1.

Referring to FIG. 2B, the electronic device 101 may include the processor 120, the sensor module 176, and a communication module 190. The external electronic device 201 may include a processor 220, a communication module 290, and a display unit 260. However, the disclosure is not limited thereto, and thus some components may be omitted.

In various embodiments, the electronic device 101 may operate by establishing a connection with the external electronic device 201. According to an embodiment, the external electronic device 201 may include at least one of electronic devices for displaying a screen such as a projector or a TV. According to an embodiment, the electronic device 101 may include at least one of electronic devices having a sensor for detecting a motion of the user of the electronic device 101. According to an embodiment, the electronic device 101 and the external electronic device 201 may be connected through at least one of a Bluetooth communication scheme, a Bluetooth Low Energy (BLE) communication scheme, a Wireless Fidelity (Wi-Fi) communication scheme, a cellular or mobile communication scheme, and a wired communication scheme.

In various embodiments, the sensor module 176 and DVS module 210 of the electronic device 101 may perform an operation similar to those of the sensor module 176 and DVS module 210 described in FIG. 2A.

In various embodiments, the communication module 190 of the electronic device 101 may be used to generate or establish a communication path between the external electronic device 201 and the electronic device 101. For example, the communication module 190 may be a module for at least one of a Bluetooth communication scheme, a Bluetooth Low Energy (BLE) communication scheme, a Wireless Fidelity (Wi-Fi) communication scheme, a cellular or mobile communication scheme, and a wired communication scheme. The communication module 190 may provide the processor 120 with a signal, information, data, or messages received from the one or more external electronic devices. The communication module 190 may transmit to the at least one or more external electronic devices the signal, information, data, or messages provided from the processor 120.

In various embodiments, the processor 120 of the electronic device 101 may perform an operation similar to that of the processor 120 described in FIG. 2A. According to an embodiment, the processor 120 may identify the external electronic device 201 via the communication module 190. The processor 120 may generate or establish a communication path between the external electronic device 201 and the electronic device 101 via the communication module 190.

In various embodiments, the communication module 290 of the external electronic device 201 may perform an operation similar to that of the communication module 190 of the electronic device 101.

In various embodiments, the display unit 260 of the external electronic device 201 may perform an operation similar to that of the display unit 160 of FIG. 2A. According to an embodiment, the external electronic device 201 may include a beam projector. The display unit 260 may include a structure (or circuit) for projecting a screen through a beam or a light source. For example, the display unit 260 may include a structure (or circuit) for projecting a screen through at least one of a Liquid Crystal Display (LCD) scheme, a Cathode Ray Tube (CRT) scheme, and a Digital Light Processing (DLP) scheme.

In various embodiments, the processor 220 of the external electronic device 201 may provide overall control to the external electronic device 201. According to an embodiment, to provide overall control to the external electronic device 201, the processor 220 may be operatively coupled to other components in the electronic device 201, such as the communication module 290 or the display unit 260. According to an embodiment, the processor 220 may receive a command of other components (e.g., the communication module 290 or the display unit 260). The processor 220 may interpret the received command. The processor 220 may perform computations according to the interpreted command, and may process data. The processor 120 may be implemented in software, or may be implemented in hardware such as a chip or a circuitry, or may be implemented in a combination of software and/or hardware. The processor 220 may be one entity or may be a combination of a plurality of processors.

According to an embodiment, the processor 220 may interpret a message, data, command, or signal received from the communication module 290 or the display unit 260. The processor 220 may process the message, data, command, or signal received from the communication module 290 or the display unit 260. The processor 220 may generate a new message, data, command, or signal based on the received message, data, command, or signal. The processor 220 may provide the processed or generated message, data, command, or signal to the communication module 290 or the display unit 260.

According to an embodiment, the processor 220 of the external electronic device 201 may receive information on content via the communication module 290 from the electronic device 101. The processor 220 may display the content via the display unit 260. For example, if the external electronic device 201 is a projector, the processor 220 may receive the information on the content to be displayed from the electronic device 101 via the communication module 290. The processor 220 may control the display unit 260 to project the content on a plane of incidence.

Figure 3A:
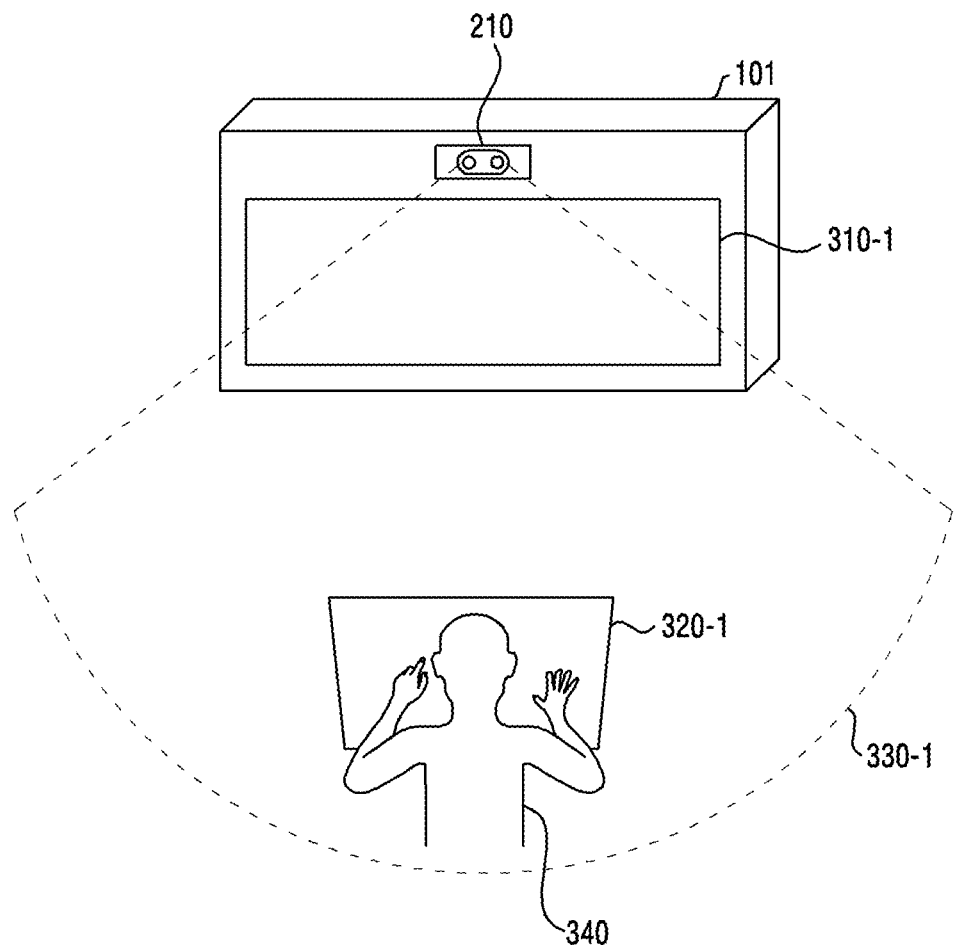
FIG. 3A illustrates an example of an electronic device for displaying content based on a motion of a user according to various embodiments.

FIG. 3A illustrates an example of an electronic device 101 for displaying content based on a motion of a user according to various embodiments. The electronic device 101 of FIG. 3A according to an embodiment may be related to the electronic device 101 of FIG. 2A.

Referring to FIG. 3A, a processor 120 of the electronic device 101 may detect a motion of a user 340 within a measurement region 330-1 measurable by using a DVS module 210. The processor 120 may identify the user 340. The processor 120 may identify a first body part of the user 340. For example, the processor 120 may identify a torso of the user 340. According to an embodiment, the processor 120 may identify (or determine) a virtual region 320-1 spaced apart by a designated distance from the first body part of the user 340. For example, the processor 120 may identify (or determine) the virtual region 320-1 at a position accessible through a second body part (e.g., a hand, a palm, or an elbow) of the user 340. According to an embodiment, the processor 120 may identify that the second body part of the user 340 enters the virtual region 320-1 via the DVS module 210. The processor 120 may identify an absolute coordinate of a position where the second body part of the user 340 enters within the virtual region 320-1. The processor 120 may identify a point (or area) within a display region 310-1 corresponding to the absolute coordinate of the position where the second body part of the user 340 enters within the virtual region 320-1. The processor 120 may change the display of content displayed on the point (or area) within a display region 310-2. For example, the processor 120 may display a cursor on the point (or area) within the display region 310-1. The processor 120 may move the cursor within the display region 310-1 according to the movement of the second body part of the user 340 within the virtual region 320-1.

Figure 3B:
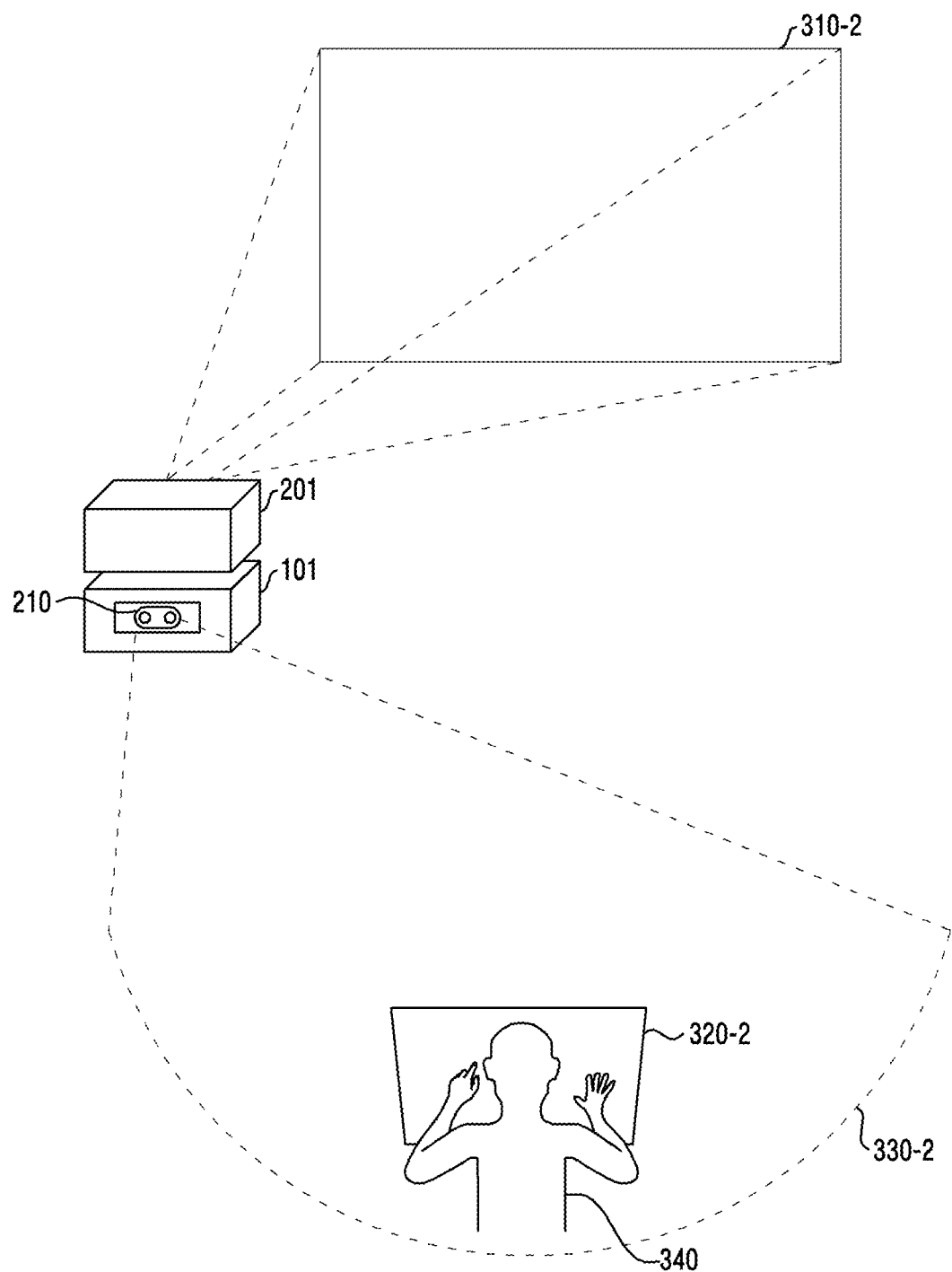
FIG. 3B illustrates an example of an electronic device for displaying content based on a motion of a user and an external electronic device according to various embodiments.

FIG. 3B illustrates an example of the electronic device 101 for displaying content based on a motion of a user and an external electronic device 201 according to various embodiments. The electronic device 101 of FIG. 3B according to an embodiment may be related to the electronic device 101 of FIG. 2B. The external electronic device 201 according to an embodiment may be related to the external electronic device 201 of FIG. 2B.

Referring to FIG. 3B, the electronic device 101 may operate by establishing a wired or wireless communication connection with the external electronic device 201. Although it is shown in FIG. 3B that the external electronic device 201 displays the display region 310-2 by projecting a screen, the disclosure is not limited thereto. According to an embodiment, the external electronic device 201 may include at least of electronic devices for displaying a screen (or content) such as a TeleVision (TV), a monitor, a Virtual Reality (VR) device, and a hologram image display device. According to an embodiment, the electronic device 101 may include at least one of electronic devices having a sensor for detecting a motion of the user 340 of the electronic device 101. According to an embodiment, the electronic device 101 may establish a communication connection with the external electronic device 201. For example, the processor 120 of the electronic device 101 may establish a connection with the external electronic device 201 through at least one of a Bluetooth communication scheme, a Bluetooth Low Energy (BLE) communication scheme, a Wireless Fidelity (Wi-Fi) communication scheme, a cellular or mobile communication scheme, and a wired communication scheme.

According to an embodiment, the processor 120 may detect the motion of the user 340 within a measurement region 330-2 measurable by using the DVS module 210. The processor 120 may identify the user 340. The processor 120 may identify a first body part of the user 340. For example, the processor 120 may identify a torso of the user 340. According to an embodiment, the processor 120 may identify (or determine) a virtual region 320-2 spaced apart by a designated distance from the first body part of the user 340. For example, the processor 120 may identify (or determine)

the virtual region 320-2 at a position accessible through a second body part (e.g., a hand, a palm, or an elbow) of the user 340. According to an embodiment, the processor 120 may identify that the second body part of the user 340 enters the virtual region 320-2 via the DVS module 210. The processor 120 may identify an absolute coordinate of a position where the second body part of the user 340 enters within the virtual region 320-2. The processor 120 may identify a point (or area) within the display region 310-2 corresponding to the absolute coordinate of the position where the second body part of the user 340 enters within the virtual region 320-1. The processor 120 may transmit, to the external electronic device 201, information on a screen (or content) in which the display of content of the point (or area) within the display region is changed. The external electronic device 201 may display the display region 310-2 based on the information on the screen (or content), received from the electronic device 101.

Hereinafter, the display region 310-1 and display region 310-2 of FIG. 3A and FIG. 3B may be referred to as a display region 310 for convenience of explanation. The virtual region 320-1 and virtual region 320-2 of FIG. 3A and FIG. 3B may be referred to as a virtual region 320. The measurement region 330-1 and measurement region 330-2 of FIG. 3A and FIG. 3B may be referred to as a measurement region 330.

An electronic device (e.g., the electronic device 101) according to various embodiments described above may include at least one sensor (e.g., the sensor module 176), a display (e.g., the display unit 160), a processor (e.g., the processor 120) operatively coupled to the at least one sensor and the display, and a memory (e.g., the memory 130) operatively coupled to the processor. The memory may store instructions, when executed, for allowing the processor to identify a first body part of a user (e.g., the user 340) based on the at least one sensor, identify a virtual region (e.g., the virtual region 320) spaced apart by a designated distance from the first body part, based on the identified first body part, identify a second body part distinct from the first body part within the virtual region, based on the at least one sensor, and change at least part of content displayed on the display based on a position of the second body part within the virtual region.

According to various embodiments, the instructions may allow the processor (e.g., the processor 120) to identify a resolution of the display (e.g., the display unit 160), and identify the virtual region (e.g., the virtual region 320) based on a ratio of the resolution.

According to various embodiments, the instructions may allow the processor (e.g., the processor 120) to identify a motion of the second body part within the virtual region (e.g., the virtual region 320), and change at least part of the displayed content, based on the motion of the second body part.

According to various embodiments, the at least one sensor (e.g., the sensor module 176) may include a Dynamic Vision Sensor (DVS) (e.g., the DVS module 210).

According to various embodiments, the instructions may allow the processor (e.g., the processor 120) to identify the virtual region (e.g., the virtual region 320) set as an absolute coordinate system.

According to various embodiments, the instructions may allow the processor (e.g., the processor 120) to identify an absolute coordinate, based on a position of the second body part within the virtual region (e.g., the virtual region 320), identify a position on the display, corresponding to the absolute coordinate, and change at least part of the content based on the identified position.

According to various embodiments, the instructions may allow the processor (e.g., the processor 120) to change at least part of the content, in response to identifying that the second body part is deviated from the virtual region.

According to various embodiments, the instructions may allow the processor (e.g., the processor 120) to identify a second user (e.g., the user 340-2) distinct from the user (e.g., the user 340), identify a second virtual region (e.g., the virtual region 840) spaced apart by a designated distance from a first body part of the second user, in response to identifying the first body part of the second user, and change at least part of the content based on a position of the second body part of the second user within the second virtual region.

An electronic device (e.g., the electronic device 101) according to various embodiments may include at least one sensor (e.g., the sensor module 176), a communication interface (e.g., the communication module 190), a processor (e.g., the processor 120) operatively coupled to the at least one sensor and the communication interface, and a memory (e.g., the memory 130) operatively coupled to the processor. The memory may store instructions, when executed, for allowing the processor to identify an external electronic device (e.g., the external electronic device 201) distinct from the electronic device via the communication interface, identify a first body part of a user (e.g., the user 340) based on the at least one sensor while the content is displayed, identify a virtual region spaced apart by a designated distance from the first body part, in response to identifying the first body part, and in response to identifying a second body part distinct from the first body part within the virtual region, change at least part of the display content based on a position of the second body part within the virtual region, based on the at least one sensor, while the content is displayed.

According to various embodiments, the instructions may allow the processor (e.g., the processor 120) to establish a connection with the external electronic device (e.g., the external electronic device 201) via the communication interface (e.g., the communication module 190).

According to various embodiments, the instructions may allow the processor (e.g., the processor 120) to identify a motion of the second body part within the virtual region (e.g., the virtual region 320), and change at least part of the displayed content, based on the motion of the second body part.

According to various embodiments, the at least one sensor (e.g., the sensor module 176) may include a Dynamic Vision Sensor (DVS) (e.g., the DVS module 210).

According to various embodiments, the instructions may allow the processor (e.g., the processor 120) to identify the virtual region (e.g., the virtual region 320) set as an absolute coordinate system.

According to various embodiments, the instructions may allow the processor (e.g., the processor 120) to identify an absolute coordinate, based on a position of the second body part within the virtual region (e.g., the virtual region 320), and change at least part of the displayed content at a position corresponding to the absolute coordinate.

According to various embodiments, the instructions may allow the processor (e.g., the processor 120) to change at least part of the displayed content, in response to releasing of the identifying of the second body part within the virtual area (e.g., the virtual region 320).

According to various embodiments, the instructions may allow the processor (e.g., the processor 120) to identify a second user distinct from the user (e.g., the user 340), identify a second virtual region spaced apart by a designated distance from a first body part of the second user, in response to identifying the first body part of the second user, and change at least part of the content based on a position of the second body part of the second user within the second virtual region.

According to various embodiments, an electronic device (e.g., the electronic device 101) may include at least one sensor (e.g., the sensor module 176), a display (e.g., the display unit 160), a processor (e.g., the processor 120) operatively coupled to the at least one sensor and the display, and a memory (e.g., the memory 130) operatively coupled to the processor. The memory may store instructions, when executed, for allowing the processor to, in response to identifying a body part of a user (e.g., the user 340) at a first position based on the at least one sensor, display a visual element within the display based on the first position and a motion of the body part of the user spaced apart from the display, identify that the user moves from the first position to a second position while the visual element is displayed, identify the body part of the user who moves to the second position, in response to identifying that the user moves from the first position to the second position, and change a position of a visual element displayed within the display based on the second position and a motion of the body part of the user, in response to identifying the body part of the user who moves to the second position.

According to various embodiments, the movement may include at least one of a rotation movement and a parallel movement.

According to various embodiments, the instructions may allow the processor (e.g., the processor 120) to identify a first virtual region corresponding to the first position, and identify the body part of the user at the first position based on the first virtual region.

According to various embodiments, the instructions may allow the processor (e.g., the processor 120) to identify a second virtual region distinct from the first virtual region and corresponding to the second position, in response to identifying that the user moves from the first position to the second position, and identify the body part of the user based on the second virtual region.

Figure 4A:
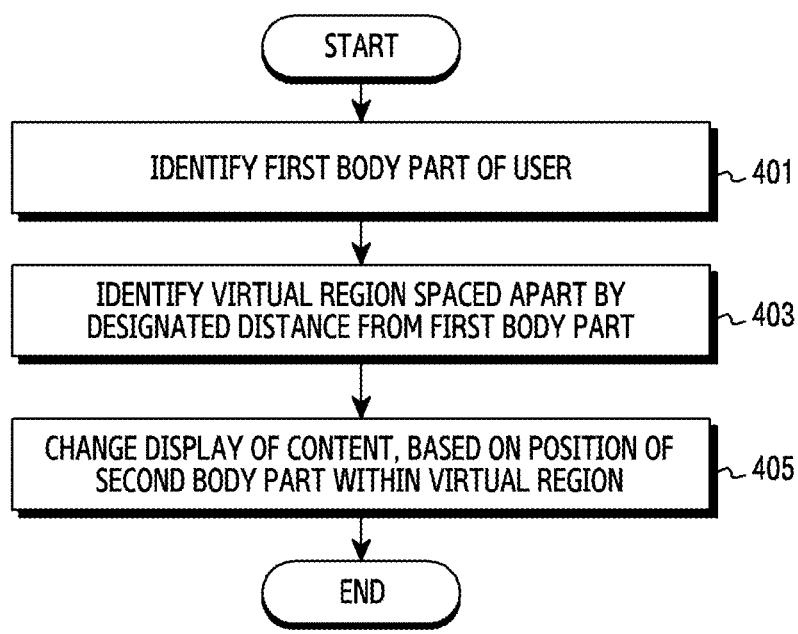
FIG. 4A illustrates an example of an operation of an electronic device according to various embodiments.

FIG. 4A illustrates an example of an operation of the electronic device 101 according to various embodiments.

Referring to FIG. 4A, in operation 401, the processor 120 may identify a first body part of the user 340. According to an embodiment, the processor 120 may identify the first body part of the user 340 of the electronic device 101 based on at least one sensor (e.g., the DVS module 210) of the electronic device 101. According to an embodiment, the first body part may include at least one of an arm, a torso, a shoulder, a foot, a leg, an eye, and a head. According to an embodiment, the first body part may include a region consisting of a plurality of body parts. For example, the processor 120 may identify a region from an eye to a waist. According to an embodiment, the processor 120 may identify a position of the user 340 via the DVS module 210. For example, the processor 120 may identify a direction and distance between the electronic device 101 and the user 340.

According to an embodiment, when the electronic device 101 operates in connection with the external electronic device 201, the processor 120 may identify the external electronic device 201 before identifying a body part of the user 340. The processor 120 may identify the external electronic device 201 via the communication module 190. According to an embodiment, the external electronic device 201 may be an electronic device for projecting content on a plane of incident. According to an embodiment, the external electronic device 201 may include at least one of electronic devices for displaying a screen (or content) such as a TeleVision (TV), a monitor, a Virtual Reality (VR) device, and a hologram image display device.

In operation 403, the processor 120 may identify (or determine) the virtual region 320 spaced apart by a designated distance from the first body part. According to an embodiment, in response to identifying the first body part, the virtual region 320 spaced apart by the designated distance from the first body part may be identified (or determined). According to an embodiment, the processor 120 may set the designated distance based on the user 340 identified via the DVS module 210. For example, the processor 120 may change the designated distance based on the distance between the user 340 and the electronic device 101. According to an embodiment, the processor 120 may identify the virtual region 320 spaced apart from the first body part accessible through a second body part (e.g., a hand, a palm, or an elbow) of the user 340. According to an embodiment, the virtual region 320 may imply a region invisible to eyes of the user 340 of the electronic device 101 but recognizable as a screen by the user 340. According to an embodiment, the processor 120 may identify (or determine) the virtual region 320 as a coordinate system having an absolute coordinate. A method in which the processor 120 identifies (or determines) the virtual region 320 as the coordinate system having the absolute coordinate will be described below in detail with reference to FIG. 5A and FIG. 5B.

According to an embodiment, the processor 120 may identify (or determine) the virtual region 320 based on the display unit 160. For example, the processor 120 may identify the virtual region 320 so as to have a ratio of a resolution of the display unit 160. For example, when the display unit 160 has a High Definition (HD) resolution of 1360×768, the processor 120 may identify the ratio of the virtual region 320 as a ratio of 16:9. For another example, when the display unit 160 has the HD resolution, the processor 120 may identify the virtual region 320 through an absolute coordinate system having the ratio of 16:9. For another example, the processor 120 may identify (or determine) the virtual region 320 based on a shape (or figure) of the display unit 160. For example, if the display unit 160 has a circular shape, the processor 120 may identify (or determine) the virtual region 320 as the circular shape. For another example, the processor 120 may identify (or determine) the virtual region 320 based on the display region 310 (e.g., the display region 310-1 or display region 310-2 of FIG. 3A and FIG. 3B) displayed via the display unit 160. For example, if the display region 310 displayed via the display unit 160 has a circular shape, the processor 120 may identify (or determine) the virtual region 320 as the circular shape.

According to an embodiment, the processor 120 may identify the virtual region 320 based on the user 340 of the electronic device 101. For example, the processor 120 may identify a length from the eyes to waist of the user 340 of the electronic device 101 as a vertical length of the virtual region 320. The processor 120 may identify a horizontal length of the virtual region 320 based on the resolution of the display unit 160. The processor 120 may identify the virtual region 320 so that the virtual region is located at a center of the body of the user 340.

In operation 405, the processor 120 may change the display of content based on a position (or motion) of a second body part within the virtual region 320. According to an embodiment, while the content is displayed in the display region 310, the processor 120 may change the display of content based on the position of the second body part within the virtual region 320, in response to identifying the second body part within the virtual region 320, distinct from the first body part, based on at least one sensor (e.g., the DVS module 210). The second body part may include at least one of a hand, a palm, a finger, and an elbow.

According to an embodiment, the processor 120 may identify that the second body part of the user 340 approaches (or enters) the virtual region 320. The processor 120 may identify a position where the second body part of the user 340 enters within virtual region 320. According to an embodiment, the processor 120 may identify a 3-dimensional position of the second body part of the user 340. The processor 120 may obtain data (e.g., a coordinate value including three different numbers) corresponding to the identified 3-dimensional position.

The processor 120 may identify that the second body part of the user 340 approaches (or enters) the virtual region 320. The processor 120 may identify an absolute coordinate in which the second body part of the user 340 enters within the virtual region 320 set as a 2-dimensional absolute coordinate system. The processor 120 may obtain data (e.g., a coordinate value including two different numbers) corresponding to an absolute coordinate based on the identified 2-dimensional absolute coordinate system. For example, the processor 120 may identify that a palm of the user 340 approaches the virtual region 320. The processor 120 may identify an absolute coordinate of a position (or area) where the palm of the user 340 enters within the virtual region 320 set as a coordinate system of 1920×1080. For example, the processor 120 may identify that the palm of the user 340 enters a coordinate of (800, 1150) or a region including the coordinate of (800, 1150).

According to an embodiment, the processor 120 may change the display of content displayed on a point (or area) of the display region 310 displayed via the display unit 160, corresponding to an absolute coordinate of the virtual region 320. According to an embodiment, the processor 120 may change the display of content based on a motion of the second body part of the user 340 of the electronic device 101.

For example, the processor 120 may recognize a tap action within the display region 310 displayed via the display unit 160, in response to identifying that a hand of the user 340 of the electronic device 101 enters the virtual region 320. For another example, the processor 120 may recognize a double click or double tap action within the display region 310 indicated via the display unit 160, in response to identifying that a palm of the user 340 of the electronic device 101 enters the virtual region 320 two times continuously.

For another example, the processor 120 may recognize a drag-and-drop action, a swipe action, or a scroll action within the display region displayed via the display unit 160, in response to identifying that the user 340 of the electronic device 101 moves to the right within the virtual region 320 with a clenched fist.

According to an embodiment, the processor 120 may change the display of content based on a motion speed of the second body part. For example, the processor 120 may identify that the palm of the user 340 approaches and changes to an action of clenching a fist, at a coordinate of the virtual region 320 corresponding to a position of first content of the display region 310. Thereafter, the processor 120 may delete the first content based on a change in a position of a hand of the user 340 to the outside of the virtual region 320 with a speed higher than or equal to a designated speed.

For another example, the processor 120 may identify that the palm of the user 340 approaches and changes to an action of clenching a fist, at a coordinate of the virtual region 320 corresponding to a position of the first content of the display region 310. Thereafter, the processor 120 may move the first content based on a change in a position of a hand of the user 340 to the outside of the virtual region 320 with a speed lower than a designated speed.

According to an embodiment, the processor 120 may identify that a plurality of second body parts of the user 340 approach (or enter) the virtual region 320. For example, it may be identified that both hands of the user 340 approach (or enter) the virtual region 320. For example, the processor 120 may change the display of content according to a motion of the both hands of the user 340 within the virtual region 320.

According to an embodiment, the processor 120 may change the display of content based on a position (or motion) of the second body part and a voice of the user 340. According to an embodiment, the electronic device 101 may include a circuit (or structure) for receiving the voice of the user 340. For example, the processor 120 may identify that the palm of the user 340 approaches at a coordinate of the virtual region 320 corresponding to a position of an application displayed within the display region 310. The processor 120 may identify that the palm of the user 340 approaches, and thereafter may identify an utterance of "execute" of the user 340. The processor 120 may perform an operation of executing the application displayed within the display region 310. According to an embodiment, the processor 120 may control an operation of the electronic device 101 based on the motion of the second body part within the virtual region 320. For example, the processor 120 may control volume of the electronic device 101 based on the motion of the second body part.

Figure 4B:
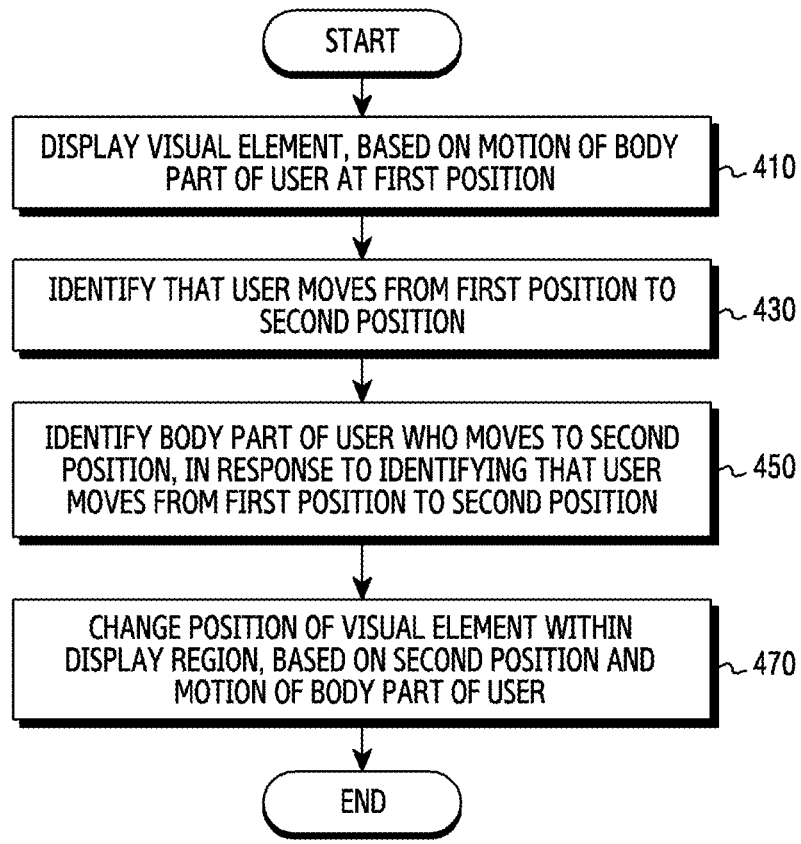
FIG. 4B illustrates another example of an operation of an electronic device according to various embodiments.

FIG. 4B illustrates another example of an operation of the electronic device 101 according to various embodiments.

Referring to FIG. 4B, in operation 410, the processor 120 may display a visual element (e.g., a cursor) via the display unit 160 based on a first position and a motion of a body part of the user 340, spaced apart by a designated distance from the display unit 160 (e.g., the display), in response to identifying the body part of the user 340 at the first position based on at least one sensor (e.g., the DVS module 210). According to an embodiment, the first position where the user 340 of the electronic device 101 is located may be located within the measurement region 330 (e.g., the measurement region 330-1 of FIG. 3A and FIG. 3B) which is a region measurable by the DVS module 210. According to an embodiment, the processor 120 may identify that the user is located at the first position via the DVS module 210. For example, the processor 120 may identify a direction or distance between the electronic device 101 and the user 340. According to an embodiment, the processor 120 may represent the measurement region 330 as a 3-dimensional coordinate. The processor 120 may identify a region where the user 340 of the electronic device 101 is located on the 3-dimensional coordinate. According to an embodiment, a body part of the user 340 may include at least one of a hand, a finger, a foot, a head, an arm, and an elbow. According to an embodiment, a visual element may include at least one of a cursor and content. For example, the processor 120 may identify a palm of the user 340. The processor 120 may identify a motion of the palm of the user 340. The processor 120 may move a cursor displayed within the display region 310 based on the identified motion of the palm of the user 340. For example, the processor 120 may identify that the palm of the user 340 moves in an upper direction. The processor 120 may move the cursor displayed within the display region 310 to the upper direction based on the upward motion of the palm of the user 340. According to an embodiment, the processor 120 may use the DVS module 210 to identify the motion of the user's body part in a situation where the electronic device 101 and the user 340 are spaced apart. For example, the processor 120 may measure an intensity of light introduced from the outside of the electronic device 101 via the DVS module 210. When the body part of the user 340 moves, the processor 120 may identify a change in the light intensity measured at the body part of the user 340. The processor 120 may identify that the body part of the user 340 moves within the measurement region 330. According to an embodiment, the processor 120 may identify (or determine) a first virtual region in front of the user 340 located at the first position. The processor 120 may display the visual element based on the motion of the body part of the user 340 within the first virtual region.

In operation 430, the processor 120 may identify that the user 340 of the electronic device 101 moves from the first position to the second position. According to an embodiment, the processor 120 may identify a movement of the user 340 via the DVS module 210. The processor 120 may identify that a region where the user 340 of the electronic device 101 is located on a 3-dimensional coordinate changes from the first position to the second position. According to an embodiment, the movement of the user 340 from the first position to the second position may include that the user 340 rotates in place or that a geographical position of the user 340 changes. According to an embodiment, the second position may be located within the measurement region 330 measurable by the DVS module 210.

In operation 450, the processor 120 may identify the body part of the user 340 who moves to the second position, in response to identifying the movement of the user 340 from the first position to the second position. According to an embodiment, the processor 120 may identify the user 340 who moves to the second position and may identify the body part of the user 340.

In operation 470, the processor 120 may change a position of a visual element within the display region 330 based on the second position and the movement of the body part of the user 340, in response to identifying the body part of the user 340 who moves to the second position. For example, the processor 120 may change a position of a cursor according to a motion of a hand of the user 340 located at the second position. According to an embodiment, the processor 120 may identify (or determine) a second virtual region in front of the user 340 located at the second position. The processor 120 may change the position of the visual element displayed via the display unit 160 based on the motion of the user's body part within the second virtual region. According to an embodiment, the processor 120 may newly identify the body part of the user 340 even if the user 340 moves from the first position to the second position. The processor 120 may change the position of the visual element based on the motion of the newly identified body part of the user 340.

According to an embodiment, when the user 340 approaches a first point (or area) of the first virtual region at the first position, the processor 120 may display the visual element at a position (or area) of the display region 310 corresponding to the first point. When the user 340 approaches a second point (or area) of the second virtual region at the second position, the processor 120 may display the visual element at a position (or area) of the display region 310 corresponding to the second point. According to an embodiment, when the first point (or area) corresponds to the same position as the second point (or area), the processor 120 may display the visual element at the same position (or area) as the display region 310. According to an embodiment, when the first point (or area) is different from the second point (or area), the visual element displayed at the position (or area) of the display region 310 corresponding to the first point may be displayed at the position (or area) of the display region 310 corresponding to the second point. When the visual element is displayed at the position (or area) of the display region 310 corresponding to the second point, the processor 120 may display the visual element by changing the position discontinuously at the position (or area) of the display region 310 corresponding to the first point.

Figure 5A:
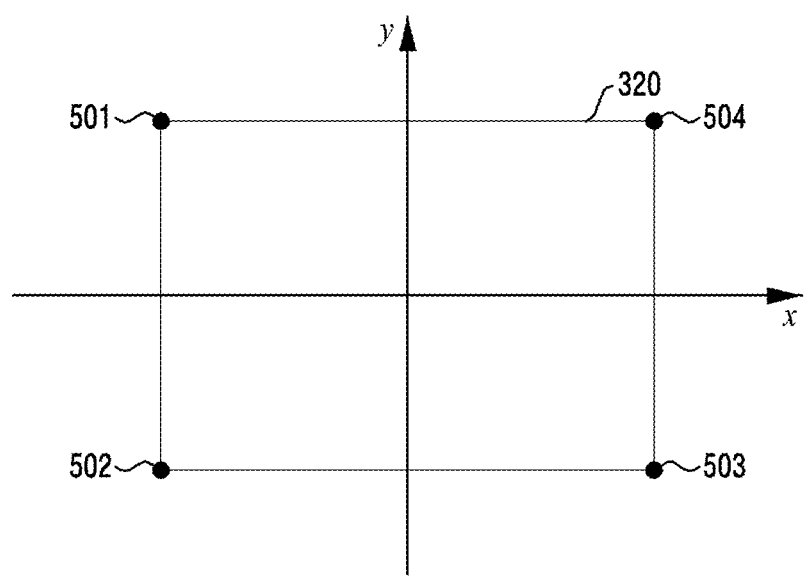
FIG. 5A illustrates an example in which a virtual region is set as an absolute coordinate system according to various embodiments.

FIG. 5A illustrates an example in which a virtual region is set as an absolute coordinate system according to various embodiments.

Referring to FIG. 5A, the processor 120 may determine the virtual region 320 based on a shape (or figure) of the display region 310 displayed via the display unit 160. For example, when the display region 310 displayed via the display unit 160 has a circular shape, the processor 120 may set (or determine) the virtual region 320 as the circular shape. For another example, when the display region 310 displayed via the display unit 160 has a rectangular shape, the processor 120 may set (or determine) the virtual region 320 as the rectangular shape. According to an embodiment, the processor 120 may identify the virtual region to have a ratio of a resolution of the display unit 160. According to an embodiment, the processor 120 may identify the virtual region 320 by scaling the display region 310 displayed via the display unit 160. For example, when the display unit 160 has a Full High Definition (FHD) resolution, the processor 120 may identify the ratio of the virtual region 320 as a ratio of 16:9. For another example, when the display unit 160 has the FHD resolution, the processor 120 may identify the virtual region 320 through an absolute coordinate system having the ratio of 16:9.

According to an embodiment, the processor 120 may identify (or determine) a coordinate system having an absolute coordinate according to the virtual region 320 of which a shape is determined. According to an embodiment, the processor 120 may identify a horizontal axis of the virtual region 320 as an X-axis. The processor 120 may identify a vertical axis of the virtual region 320 as a Y-axis. The processor 120 may identify an absolute coordinate of one point of the virtual region 320 as (x, y). According to an embodiment, the processor 120 may identify (or determine) the virtual region 320 having a rectangular shape consisting of points 501 to 504. The processor 120 may identify (or determine) a center of the virtual region 320 as a center of the absolute coordinate system. The processor 120 may identify (or determine) the center of the virtual region 320 as an absolute coordinate of (0, 0). According to an embodiment, the coordinate of the points 501 to 504 of the virtual region may be identified (or determined) based on a resolution (or pixel) of the display unit 160. For example, when the resolution of the display unit 160 is FHD of 1920×1080, the processor 120 may identify (or determine) the absolute coordinate of the point 501 as (−960, 540), the absolute coordinate of the point 502 as (−960, −540), the absolute coordinate of the point 503 as (960, −540), and the absolute coordinate of the point 504 as (960, 540) according to a pixel based on the resolution. According to an embodiment, the processor 120 may determine the absolute coordinate of the virtual region 320 in various manners. For example, the processor 120 may change an interval between grids by fixing the coordinate of the points 501 to 504 to a predetermined coordinate.

According to an embodiment, the processor 120 may map the absolute coordinate of the virtual region 320 to the display region 310. The processor 120 may identify that a body part of the user 340 approaches (or enters) within the virtual region 320. The processor 120 may identify an absolute coordinate of the virtual region 320 at a position where the body part of the user 340 approaches. The processor 120 may change content at the position of the display region 310 mapped to the absolute coordinate of the virtual region 320.

Figure 5B:
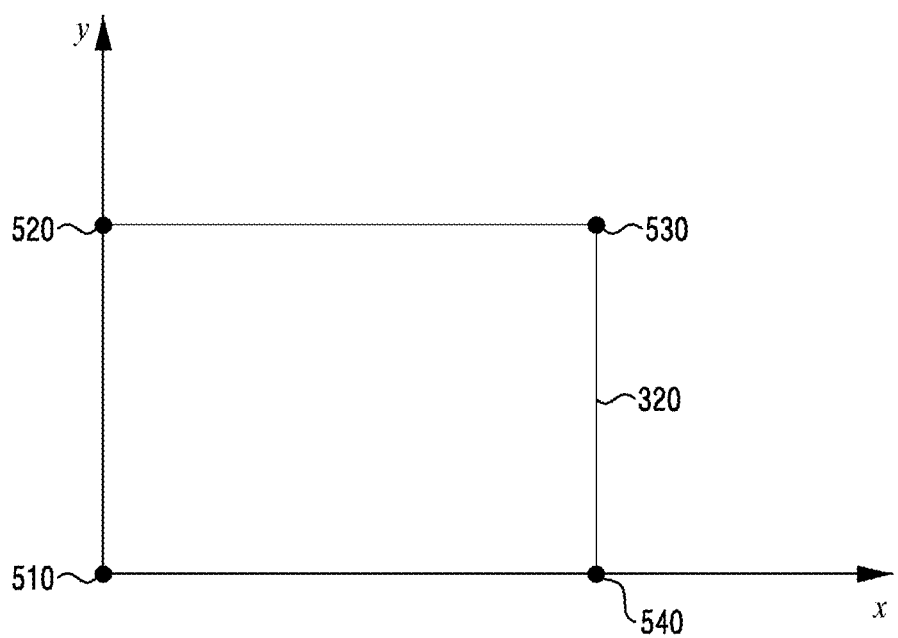
FIG. 5B illustrates another example in which a virtual region is set as an absolute coordinate system according to various embodiments.

FIG. 5B illustrates another example in which a virtual region is set as an absolute coordinate system according to various embodiments.

Referring to FIG. 5B, the processor 120 may identify (or determine) a coordinate system having an absolute coordinate according to the virtual region 320 of which a shape is determined. According to an embodiment, the processor 120 may identify a horizontal axis of the virtual region 320 as an X-axis. The processor 120 may identify a vertical axis of the virtual region 320 as a Y-axis. The processor 120 may identify an absolute coordinate of one point of the virtual region 320 as (x, y). According to an embodiment, the processor 120 may identify (or determine) the virtual region 320 having a rectangular shape consisting of points 510 to 540. The processor 120 may identify (or determine) the point 510 of the virtual region 320 as a center of the absolute coordinate system. The processor 120 may identify (or determine) the point 510 of the virtual region 320 as an absolute coordinate of (0, 0). According to an embodiment, the coordinate of the points 510 to 540 of the virtual region may be identified (or determined) based on a resolution (or pixel) of the display unit 160. For example, when the resolution of the display unit 160 is FHD of 1920×1080, the processor 120 may identify (or determine) the absolute coordinate of the point 510 as (0, 0), the absolute coordinate of the point 520 as (0, 1080), the absolute coordinate of the point 530 as (1920, 1080), and the absolute coordinate of the point 540 as (1920, 0), based on a pixel depending on the resolution. According to an embodiment, the processor 120 may determine the absolute coordinate of the virtual region 320 in various manners. For example, the processor 120 may change an interval between grids by fixing the coordinate of the points 501 to 504 to a predetermined coordinate.

Although it is described that the virtual region 320 has a rectangular shape with reference to FIG. 5A and FIG. 5B for convenience of explanation, the disclosure is not limited thereto, and thus the processor 120 may indicate the virtual region 320 having various shapes as an absolute coordinate system.

Figure 6:
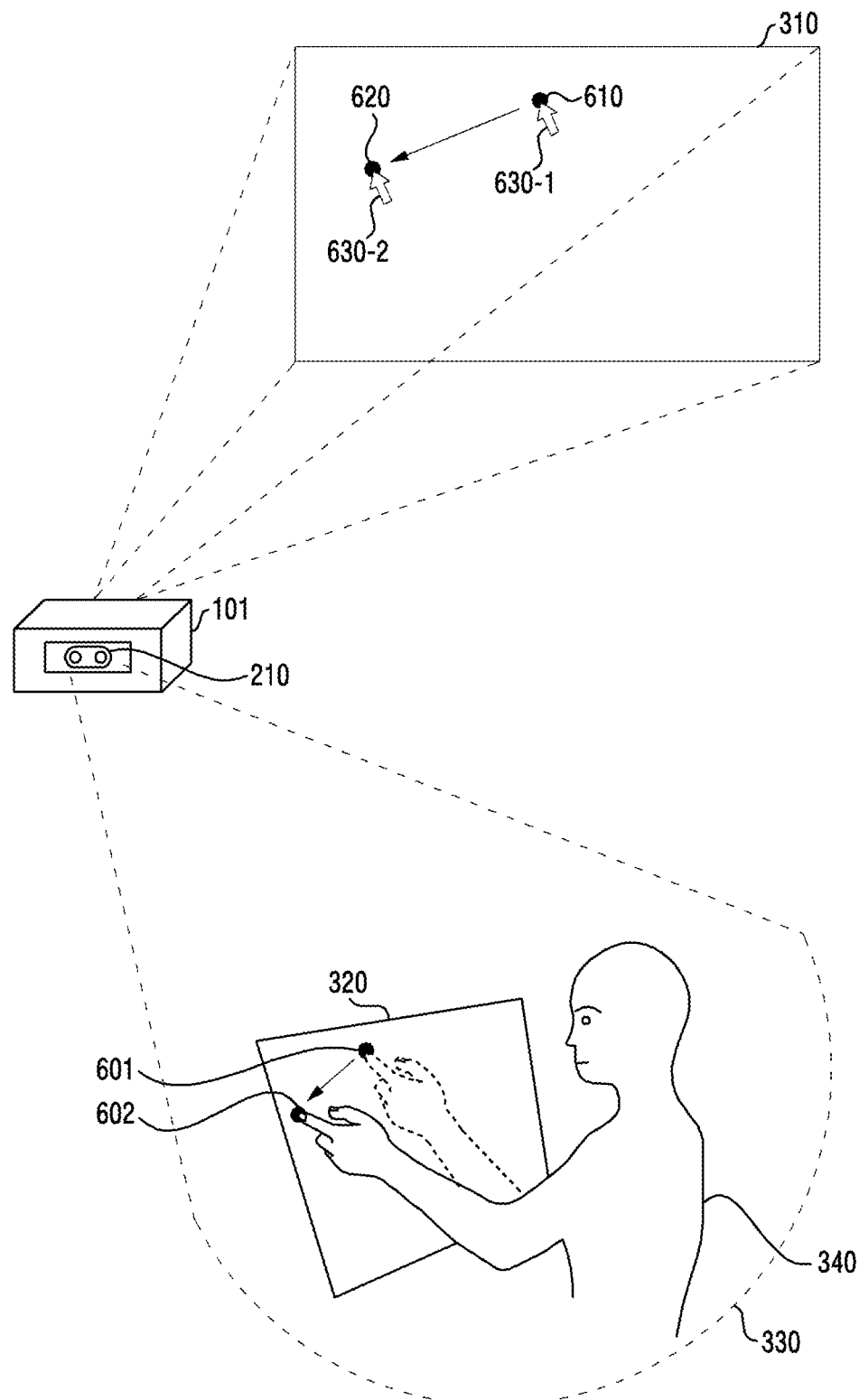
FIG. 6 illustrates another example of an electronic device for displaying content based on a motion of a user according to various embodiments.

FIG. 6 illustrates another example of the electronic device 101 for displaying content based on a motion of a user according to various embodiments.

Referring to FIG. 6, the processor 120 may identify the user 340 within the measurement region 330 via the DVS module 210. The processor 120 may identify the virtual region 320 based on a position of the user 340 located within the measurement region 330. The processor 120 may identify that a body part of the user 340 is located at a first point 601. According to an embodiment, the processor 120 may identify that the body part of the user 340 approaches (or enters) the first point 601 within the virtual region 320. The processor 120 may identify a first coordinate of the first point 601 in the virtual region 320 set as an absolute coordinate system. For example, the processor 120 may identify that an index finger of the user 340 approaches (or enters) the first point 601 of the virtual region 320. The processor 120 may identify the first coordinate of the first point 601 where the index finger of the user 340 approaches (or enters).

According to an embodiment, the processor 120 may display the display region 310 corresponding to an absolute coordinate system of the virtual region 320 via the display unit 160. The processor 120 may display a cursor 630-1 of a first position 610 within the display region 310 corresponding to the identified first coordinate. According to an embodiment, the processor 120 may perform at least one of click, tap, double click, and drag-and-drop actions through the cursor 630-1 based on a motion of the user 340.

According to an embodiment, the processor 120 may identify the first point 601 where the body part of the user 340 is deviated from the virtual region 320. The processor 120 may maintain a position of the cursor 630-1 of the first position 610. According to an embodiment, the processor 120 may identify that the approach of the body part of the user 340 is released from the first point 601 of the virtual region 320. The processor 120 may make the cursor 630-1 of the first position 610 hidden (or disappear), in response to identifying that the body part of the user 340 is deviated from the virtual region 320.

According to an embodiment, the processor 120 may identify that a body part of the user 340 is located at a second point 602. According to an embodiment, the processor 120 may identify that the body part of the user 340 approaches (or enters) the second point 602 within the virtual region 320. The processor 120 may identify a second coordinate of the second point 602 in the virtual region 320 set as an absolute coordinate system. For example, the processor 120 may identify that an index finger of the user 340 approaches (or enters) the second point 602 of the virtual region 320. The processor 120 may identify the second coordinate of the second point 602 where the index finger of the user 340 approaches (or enters).

According to an embodiment, the processor 120 may display a cursor 630-2 of a second position 620 within the display region 310 corresponding to the identified second coordinate. According to an embodiment, the processor 120 may display the cursor 630-2 at the second position 620 by discontinuously moving the cursor 630-1 located at the first position 610 to the second position 620, in response to identifying the second coordinate of the second point 602 where a body part (e.g., an index finger) of the user 340 approaches (or enters). According to an embodiment, the processor 120 may display at the second position 620 the same cursor 630-2 as the cursor 630-1 which is hidden at the first position 610, in response to identifying the second coordinate of the second point 602 where the body part (e.g., the index finger) of the user 340 approaches (or enters).

According to an embodiment, the processor 120 may identify that the body part of the user 340 moves from the first point 601 to the second point 602 within the virtual region 320. The processor 120 may display the cursor 630-2 at the second position 620 by continuously moving to the second position 620 the cursor 630-1 located at the first position 610, in response to identifying that the body part of the user 340 moves from the first point 601 to the second point 602.

Although an example in which the display region 310 is displayed via the electronic device 101 is shown with reference to FIG. 6, the disclosure is not limited thereto. As shown in FIG. 3B, the electronic device 101 may establish a connection with the external electronic device 201, and may display the display region 310 via the external electronic device 201.

Figure 7A:
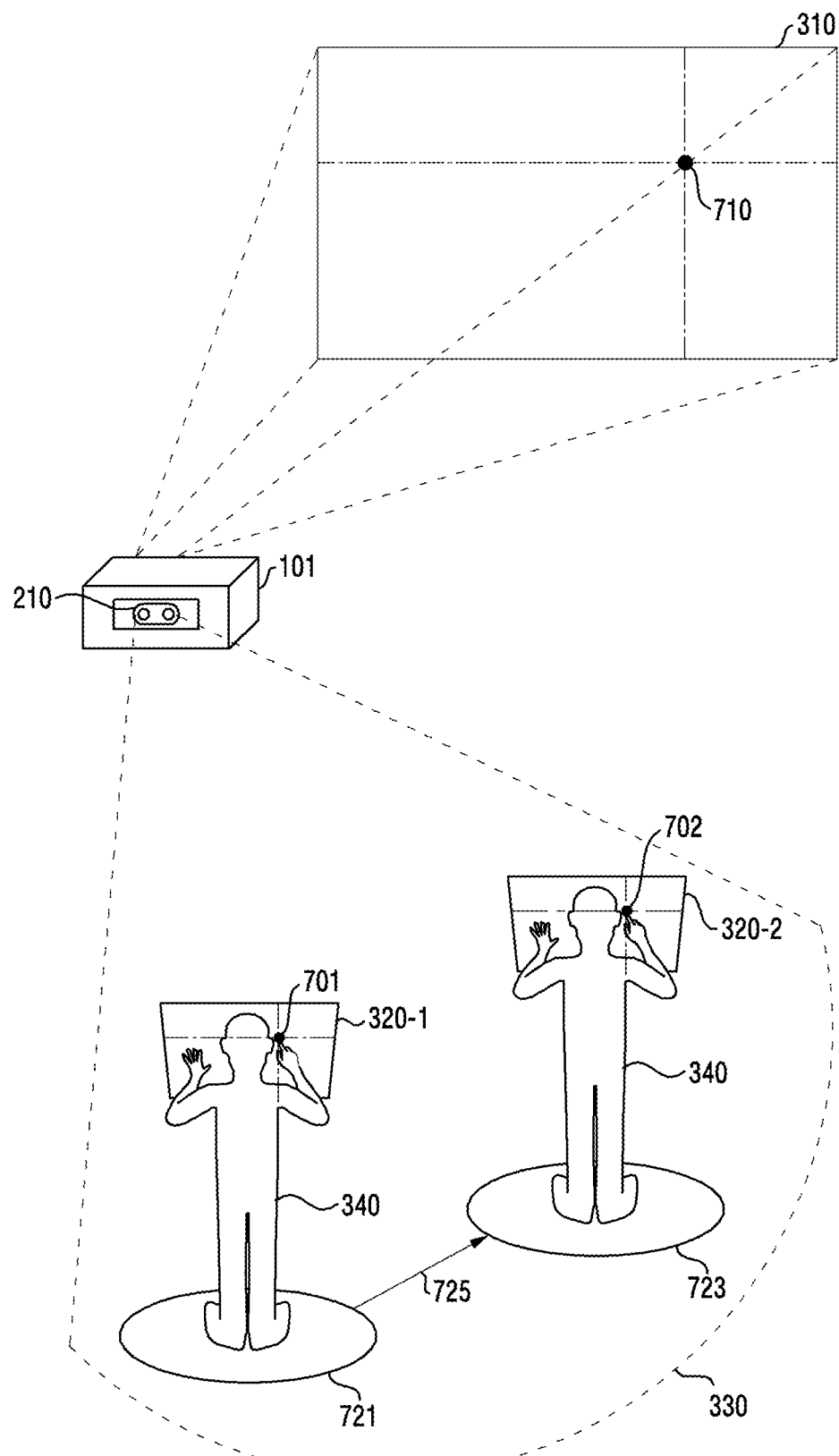
FIG. 7A illustrates another example of an electronic device for displaying content based on a motion of a user according to various embodiments.

FIG. 7A illustrates another example of the electronic device 101 for displaying content based on a motion of the user 340 according to various embodiments.

Referring to FIG. 7A, the processor 120 may identify the user 340 of the electronic device 101 located at a first position 721 via the DVS module 210. The first position 721 where the user 340 of the electronic device 101 is located may be located within the measurement region 330 which is a region measurable by the DVS module 210. The processor 120 may identify a direction or distance between the electronic device 101 and the user 340. According to an embodiment, the processor 120 may represent the measurement region 330 as a 3-dimensional coordinate. The processor 120 may identify that a region where the user 340 of the electronic device 101 is located on the 3-dimensional coordinate is the first position 721. The processor 120 may identify the first virtual region 320-1 based on the first position 721.

According to an embodiment, the processor 120 may identify that a body part of the user 340 at the first position 721 is located at a point 701. According to an embodiment, the processor 120 may identify that the body part of the user 340 approaches (or enters) the point 701 within the first virtual region 320-1. The processor 120 may identify a first coordinate of the point 701 in the first virtual region 320-1 set as an absolute coordinate system. For example, the processor 120 may identify that an index finger of the user 340 approaches (or enters) the point 701 of the first virtual region 320-1. The processor 120 may identify the first coordinate of the point 701 where the index finger of the user 340 approaches (or enters).

According to an embodiment, the processor 120 may display the display region 310 corresponding to an absolute coordinate system of the first virtual region 320-1 via the display unit 160. The processor 120 may change the display of content of a point 710 within the display region 310 corresponding to the identified first coordinate. According to an embodiment, the point 710 may include a specific region.

According to an embodiment, the processor 120 may identify that the user 340 of the electronic device 101 moves from the first position 721 to a second position 723 along a direction 725. According to an embodiment, the processor 120 may use the DVS module 210 to identify that the user 340 of the electronic device 101 moves from the first position 721 to the second position 723 on the identified 3-dimensional coordinate. The second position 723 may be located within the measurement region 330 which is a region measurable by the DVS module 210.

According to an embodiment, the processor 120 may identify the second virtual region 320-2 in response to identifying that the user 340 of the electronic device 101 is located at the second position 723. According to an embodiment, the processor 120 may newly set (or determine) the second virtual region 320-2 based on the user 340 of the second position 723. For example, the processor 120 may identify the second virtual region 320-2 spaced apart by a designated distance from the first body part of the user 340. The processor 120 may identify (or determine) the second virtual region 320-2 to have the same size and shape as the first virtual region 320-1.

According to an embodiment, the processor 120 may identify that the body part of the user 340 located at the second position 723 is located at the point 702. According to an embodiment, the processor 120 may identify that the body part of the user 340 approaches (or enters) the point 702 within the second virtual region 320-2. The processor 120 may identify the second coordinate of the point 702 at the second virtual region 320-2 set as the absolute coordinate system. For example, the processor 120 may identify that an index finger of the user 340 approaches (or enters) the point 702 of the second virtual region 320-2. The processor 120 may identify the second coordinate of the point 702 where the index finger of the user 340 approaches (or enters). According to an embodiment, the processor 120 may identify that the first coordinate and the second coordinate have the same coordinate value. The processor 120 may change the display of content of the point 710 within the display region 310 corresponding to the second coordinate. According to an embodiment, the point 710 may include a specific region.

According to an embodiment, even if the user 340 is located at another position, when the body part of the user 340 approaches (or enters) at a point having the same absolute coordinate within a virtual region (e.g., the first virtual region 320-1 or the second virtual region 320-2), the processor 120 may change content of the same point (or area) within the display region 310.

Figure 7B:
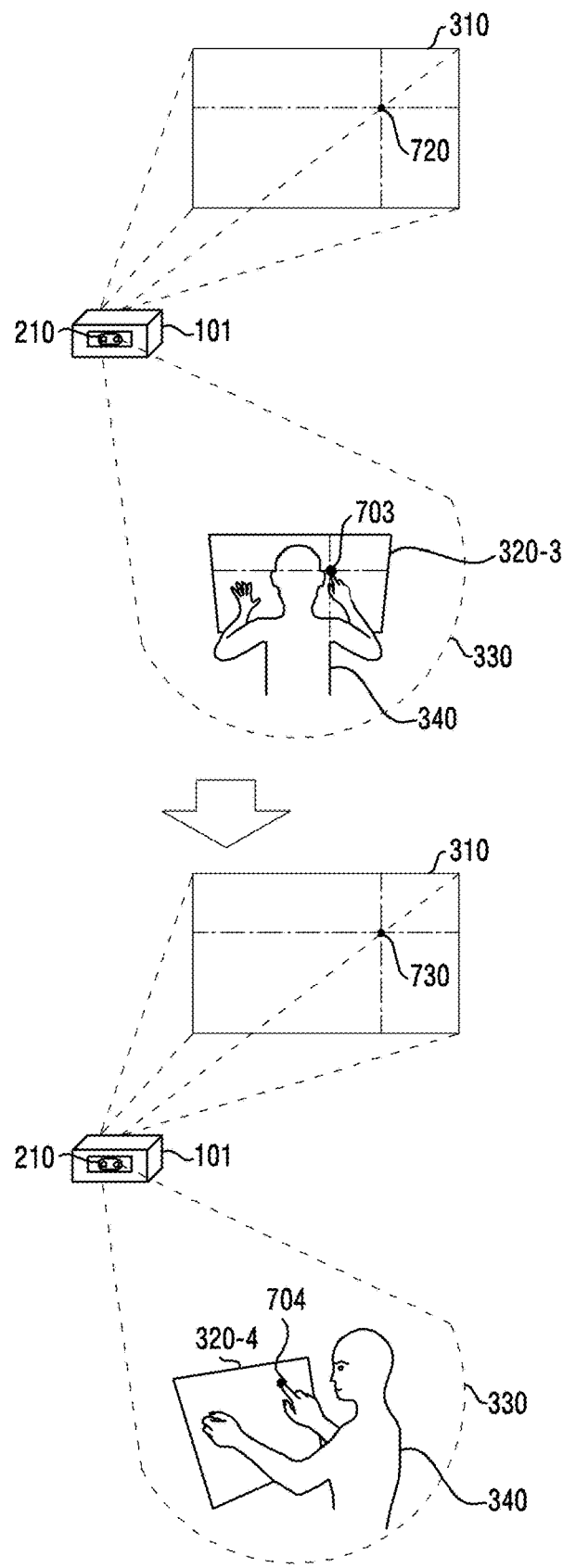
FIG. 7B illustrates another example of an electronic device for displaying content based on a motion of a user according to various embodiments.

FIG. 7B illustrates another example of the electronic device 101 for displaying content based on a motion of the user 340 according to various embodiments.

Referring to FIG. 7B, the processor 120 may identify the user 340 of the electronic device 101 via the DVS module 210. The user 340 of the electronic device 101 may be located within the measurement region 330 which is a region measurable by the DVS module 210. The processor 120 may identify a third virtual region 320-3 based on the position of the user 340 within the measurement region 330.

According to an embodiment, the processor 120 may identify that a body part of the user 340 is located at a point 703. According to an embodiment, the processor 120 may identify that the body part of the user 340 approaches (or enters) the point 703 within the third virtual region 320-3. The processor 120 may identify a first coordinate of the point 703 in the third virtual region 320-3 set as an absolute coordinate system. For example, the processor 120 may identify that an index finger of the user 340 approaches (or enters) the point 703 of the third virtual region 320-3. The processor 120 may identify the first coordinate of the point 703 where the index finger of the user 340 approaches (or enters).

According to an embodiment, the processor 120 may display the display region 310 corresponding to an absolute coordinate system of the third virtual region 320-3 via the display unit 160. The processor 120 may change the display of content of a point 720 within the display region 310 corresponding to the identified first coordinate. According to an embodiment, the point 720 may include a specific region.

According to one embodiment, the processor 120 may identify that the user 340 of the electronic device 101 rotates in place. According to an embodiment, the processor 120 may identify a fourth virtual region 320-4 in response to identifying that the user 340 of the electronic device 101 rotates in place (e.g., rotates to the left). According to an embodiment, the processor 120 may newly set (or determine) the fourth virtual region 320-4 based on a direction in which the user 340 is looking. For example, the processor 120 may identify the fourth virtual region 320-4 spaced apart by a designated distance from the first body part of the user 340. The processor 120 may identify (or determine) the fourth virtual region 320-4 to have the same size and shape as the third virtual region 320-3. According to an embodiment, the processor 120 may identify (or determine) the third virtual region 320-3 and the fourth virtual region 320-4 to be located in front of the user 340.

According to an embodiment, the processor 120 may identify that the body part of the user 340 who has rotated in place is located at a point 704. According to an embodiment, the processor 120 may identify that the body part of the user 340 approaches (or enters) the point 704 within the fourth virtual region 320-4. The processor 120 may identify a second coordinate of the point 704 in the fourth virtual region 320-4 set as an absolute coordinate system. For example, the processor 120 may identify that an index finger of the user 340 approaches (or enters) the point 704 of the fourth virtual region 320-4. The processor 120 may identify the second coordinate of the point 704 where the index finger of the user 340 approaches (or enters). According to an embodiment, the processor 120 may identify that the first coordinate and the second coordinate have different coordinate values. The processor 120 may change the display of content of the point 730 within the display region 310 corresponding to the identified second coordinate. According to an embodiment, the point 730 may include a specific region.

According to an embodiment, when the user 340 rotates in place (e.g., rotates to the right), the processor 120 may newly identify (or determine) a virtual region (e.g., the third virtual region 320-3) in front of the user 340. The processor 120 may change the display of content based on a motion of the body part of the user 340 within the newly identified (or determined) virtual region.

Although an example in which the display region 310 is displayed via the electronic device 101 is shown with reference to FIG. 7A and FIG. 7B, the disclosure is not limited thereto. As shown in FIG. 3B, the electronic device 101 may establish a connection with the external electronic device 201, and may display the display region 310 via the external electronic device 201.

Figure 8:
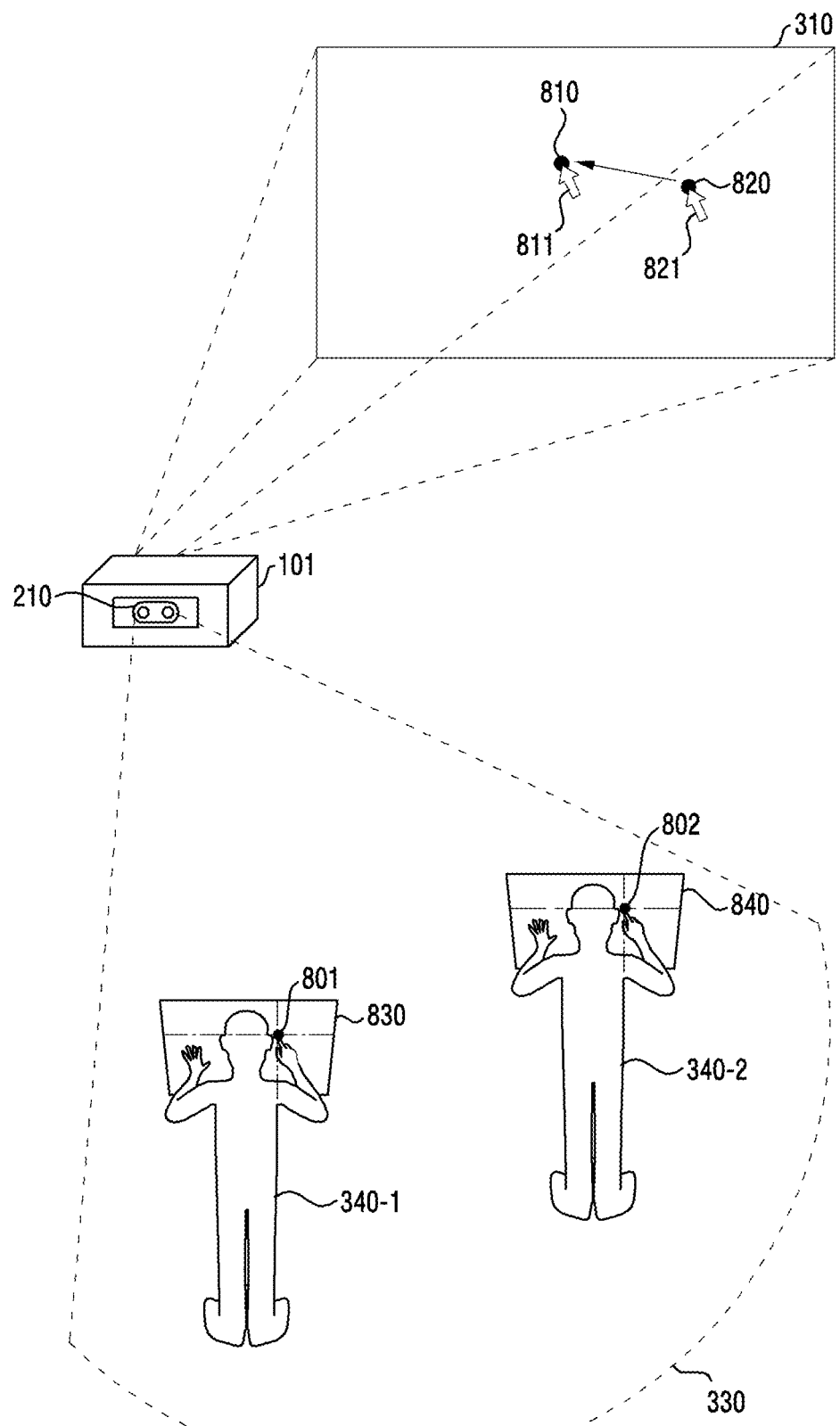
FIG. 8 illustrates another example of an electronic device for displaying content based on a motion of a user according to various embodiments.

FIG. 8 illustrates another example of the electronic device 101 for displaying content based on a motion of a user according to various embodiments.

Referring to FIG. 8, the processor 120 may identify a plurality of users within the measurement region 330 via the DVS module 210. The processor 120 may identify a plurality of virtual regions respectively corresponding to the plurality of users. According to an embodiment, the processor 120 may identify a virtual region 830 corresponding to a first user 340-1. The processor 120 may identify a virtual region 840 corresponding to a second user 340-2. Each of the virtual region 830 and the virtual region 840 may correspond to the display region 310.

According to an embodiment, the processor 120 may identify that a body part of the first user 340-1 approaches (or enters) a first point 801 within the virtual region 830. The processor 120 may identify a first coordinate of the first point 801 in the virtual region 830 set as an absolute coordinate system. For example, the processor 120 may identify that an index finger of the first user 340-1 approaches (or enters) the first point 801 of the virtual region 830. The processor 120 may identify the first coordinate of the first point 801 where the index finger of the first user 340-1 approaches (or enters). The processor 120 may display a first cursor 811, which moves based on a motion of the body part of the first user 340-1, at a first display point 810 within the display region 310 corresponding to the first coordinate.

The processor 120 may identify that the body part of the second user 340-2 approaches (or enters) a second point 802 within the virtual region 840. The processor 120 may identify a second coordinate of the second point 802 in the virtual region 840 set as an absolute coordinate system. For example, the processor 120 may identify that an index finger of the second user 340-2 approaches (or enters) the second point 802 of the virtual region 840. The processor 120 may identify the second coordinate of the second point 802 where the index finger of the second user 340-2 approaches (or enters). The processor 120 may display a second cursor 821, which moves based on a motion of the body part of the second user 340-2, at a second display point 820 within the display region 310 corresponding to the second coordinate.

According to an embodiment, the processor 120 may move the cursor 811 within the display region 310 based on the motion of the body part of the first user 340-1. The processor 120 may move a cursor 821 within the display region 310 based on the motion of the body part of the second user 340-2. According to an embodiment, the processor 120 may independently identify the motion of the body part of the first user 340-1 and the motion of the body part of the second user 340-2. The processor 120 may independently display the cursor 811 and the cursor 821 within the display region 310.

According to an embodiment, the processor 120 may move one cursor (e.g., the cursor 811) within the display region 310 based on the motion of a plurality of users (e.g., the first user 340-1 or the second user 340-2). For example, the processor 120 may move the cursor 811 within the display region 310 based on the motion of a body part of the first user 340-1. The processor 120 may move the cursor 811, which moves based on the motion of the first user 340-1, within the display region 310 based on the motion of the body part of the second user 340-2. According to an embodiment, the processor 120 may simultaneously identify a plurality of inputs from a plurality of users (e.g., the first user 340-1 or the second user 340-2). The processor 120 may identify priorities of the plurality of inputs identified from the plurality of users. The processor 120 may move one cursor (e.g., the cursor 811) within the display region 310 based on the identified priority. For example, the processor 120 may receive the first input from the first user 340-1 and the second input from the second user 340-2 at the same timing. The processor 120 may identify that the first input has a higher priority than the second input. The processor 120 may move one cursor (e.g., the cursor 811) within the display region 310 based on the first input received from the first user.

Although an example in which the display region 310 is displayed via the electronic device 101 is shown with reference to FIG. 8, the disclosure is not limited thereto. As shown in FIG. 3B, the electronic device 101 may establish a connection with the external electronic device 201, and may display the display region 310 via the external electronic device 201.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
 a sensor;
 a display configured to display a content on a display region;
 a processor operatively coupled to the sensor and the display; and a memory operatively coupled to the processor and storing instructions that, when executed by the processor, cause the processor to:
identify a resolution of the display;
identify a first body part of a user based on the sensor;
identify a virtual region spaced apart by a designated distance from the first body part based on the identified first body part, wherein the virtual region comprises a plane disposed in a 3-dimensional space;
identify a point of a second body part distinct from the first body part within the virtual region based on the sensor;
determine an absolute coordinate of the point of the second body part according to a pixel based on the resolution of the display;
map the absolute coordinate of the point of the second body part to a position of the display region; and
change at least part of the content displayed on the display based on the position of the display region mapped to the absolute coordinate of the point of the second body part.

2. The electronic device of claim 1, wherein the memory stores instructions that, when executed by the processor, cause the processor to:
identify a ratio of the virtual region based on a ratio of the resolution.

3. The electronic device of claim 1, wherein the memory stores instructions that, when executed by the processor, cause the processor to:
identify a motion of the second body part within the virtual region; and
change the at least part of the content based on the motion of the second body part.

4. The electronic device of claim 1, wherein the sensor includes a Dynamic Vision Sensor (DVS).

5. The electronic device of claim 1, wherein the memory stores instructions that, when executed by the processor, cause the processor to change the at least part of the content in response to identifying that the second body part is deviated from the virtual region.

6. The electronic device of claim 1, wherein the memory stores instructions that, when executed by the processor, cause the processor to:
identify a second user distinct from the user;
identify a second virtual region spaced apart by a designated distance from a first body part of the second user in response to identifying the first body part of the second user; and
change the at least part of the content based on a position of the second body part of the second user within the second virtual region.

7. An electronic device comprising:
a sensor;
a communication interface;
a processor operatively coupled to the sensor and the communication interface; and
a memory operatively coupled to the processor and storing instructions that, when executed by the processor, cause the processor to:
identify an external electronic device distinct from the electronic device via the communication interface;
identify a first body part of a user based on the sensor while content is displayed on a display;
identify a resolution of the display;
identify a virtual region spaced apart by a designated distance from the first body part in response to identifying the first body part, wherein the virtual region comprises a plane disposed in a 3-dimensional space;
in response to identifying a point of a second body part distinct from the first body part within the virtual region;
determine an absolute coordinate of the point of the second body part according to a pixel based on the resolution of the display;
map the absolute coordinate of the point of the second body part to a position of the display; and
change at least part of the content based on the position of the display mapped to the absolute coordinate of the point of the second body part.

8. The electronic device of claim 7, wherein the memory stores instructions that, when executed by the processor, cause the processor to establish a connection with the external electronic device via the communication interface.

9. The electronic device of claim 7, wherein the memory stores instructions that, when executed by the processor, cause the processor to:
identify a motion of the second body part within the virtual region; and
change at least part of the content based on the motion of the second body part.

10. The electronic device of claim 7, wherein the sensor includes a Dynamic Vision Sensor (DVS).

11. The electronic device of claim 7, wherein the memory stores instructions that, when executed by the processor, cause the processor to change at least part of the content in response to releasing of the identifying of the second body part within the virtual region.

12. The electronic device of claim 7, wherein the memory stores instructions that, when executed by the processor, cause the processor to:
identify a second user distinct from the user;
identify a second virtual region spaced apart by a designated distance from a first body part of the second user in response to identifying the first body part of the second user; and
change at least part of the content based on a position of the second body part of the second user within the second virtual region.

13. The electronic device of claim 1, wherein the second body part comprises a hand of the user, and
wherein the memory stores instructions that, when executed by the processor, cause the processor to:
identify that a palm of the second body part approaches and changes to an action of clenching a fist at the absolute coordinate corresponding to a position of the content; and
after identifying that the palm approaches and changes to the action of clenching the fist:
based on a change in a position of the hand of the user to an outside of the virtual region with a speed higher than or equal to a designated speed, delete at least a part of the content, and
based on a change in the position of the hand of the user to the outside of the virtual region with a speed lower than the designated speed, move the content.

14. The electronic device of claim 4, wherein the DVS included in a DVS module, and
wherein the DVS module configures a plurality of pixels from a plurality of light receiving elements, and outputs data related to one or more pixels in which an intensity change of light is greater than or equal to a threshold among intensities of light output from the plurality of pixels.

* * * * *